US012593191B2

(12) United States Patent
Visser et al.

(10) Patent No.: US 12,593,191 B2
(45) Date of Patent: Mar. 31, 2026

(54) ACOUSTIC CONFIGURATION BASED ON RADIO FREQUENCY SENSING

(71) Applicant: QUALCOMM Incorporated, San Diego, CA (US)

(72) Inventors: Erik Visser, San Diego, CA (US); Lae-Hoon Kim, San Diego, CA (US); Jason Filos, San Diego, CA (US); Xiaoxin Zhang, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 115 days.

(21) Appl. No.: 18/549,508

(22) PCT Filed: May 2, 2022

(86) PCT No.: PCT/US2022/027333
§ 371 (c)(1),
(2) Date: Sep. 7, 2023

(87) PCT Pub. No.: WO2022/240609
PCT Pub. Date: Nov. 17, 2022

(65) Prior Publication Data
US 2024/0155303 A1 May 9, 2024

(30) Foreign Application Priority Data

May 14, 2021 (GR) .............................. 20210100326

(51) Int. Cl.
*H04S 7/00* (2006.01)
*G01S 7/00* (2006.01)
(Continued)

(52) U.S. Cl.
CPC .............. *H04S 7/303* (2013.01); *G01S 7/006* (2013.01); *G01S 7/411* (2013.01); *G01S 13/726* (2013.01);
(Continued)

(58) Field of Classification Search
CPC .. H04S 7/303; H04S 2400/11; H04S 2400/15; H04R 3/005; H04R 5/027; G01S 7/006; G01S 7/411; G01S 13/72
(Continued)

(56) References Cited

U.S. PATENT DOCUMENTS

| | | | | | |
|---|---|---|---|---|---|
| 2013/0272548 | A1* | 10/2013 | Visser | ...................... | H04R 3/00 |
| | | | | | 382/103 |
| 2014/0372129 | A1* | 12/2014 | Tzirkel-Hancock | .... | G01S 13/06 |
| | | | | | 704/278 |

(Continued)

FOREIGN PATENT DOCUMENTS

WO 2017118983 A1 7/2017

OTHER PUBLICATIONS

International Search Report and Written Opinion—PCT/US2022/027333—ISA/EPO—Aug. 23, 2022.

*Primary Examiner* — William A Jerez Lora
(74) *Attorney, Agent, or Firm* — QUALCOMM Incorporated; Espartaco Diaz Hidalgo

(57) ABSTRACT

Disclosed are systems and techniques for detecting audio sources and configuring acoustic device settings. For instance, a wireless device can obtain a first set of radio frequency (RF) sensing data associated with a first plurality of received waveforms corresponding to a first transmitted waveform reflected off of a plurality of reflectors. Based on the first set of RF sensing data, the wireless device can determine a classification of a first reflector from the plurality of reflectors. The wireless device can determine at least one acoustic setting based on the classification of the at least one reflector.

31 Claims, 13 Drawing Sheets

(51) Int. Cl.
*G01S 7/41* (2006.01)
*G01S 13/72* (2006.01)
*H04R 3/00* (2006.01)
*H04R 5/027* (2006.01)

(52) U.S. Cl.
CPC ............. *H04R 3/005* (2013.01); *H04R 5/027* (2013.01); *H04S 2400/11* (2013.01); *H04S 2400/15* (2013.01)

(58) Field of Classification Search
USPC ................................................ 381/303, 311
See application file for complete search history.

(56) References Cited

U.S. PATENT DOCUMENTS

| | | | | |
|---|---|---|---|---|
| 2015/0036848 A1* | 2/2015 | Donaldson | ............. | H04S 7/303 |
| | | | | 381/303 |
| 2016/0094914 A1* | 3/2016 | Saniee | ................... | H04R 1/403 |
| | | | | 381/80 |
| 2018/0139565 A1* | 5/2018 | Norris | .................... | H04S 7/304 |
| 2019/0384409 A1* | 12/2019 | Omer | ................... | G01S 13/878 |

* cited by examiner

700

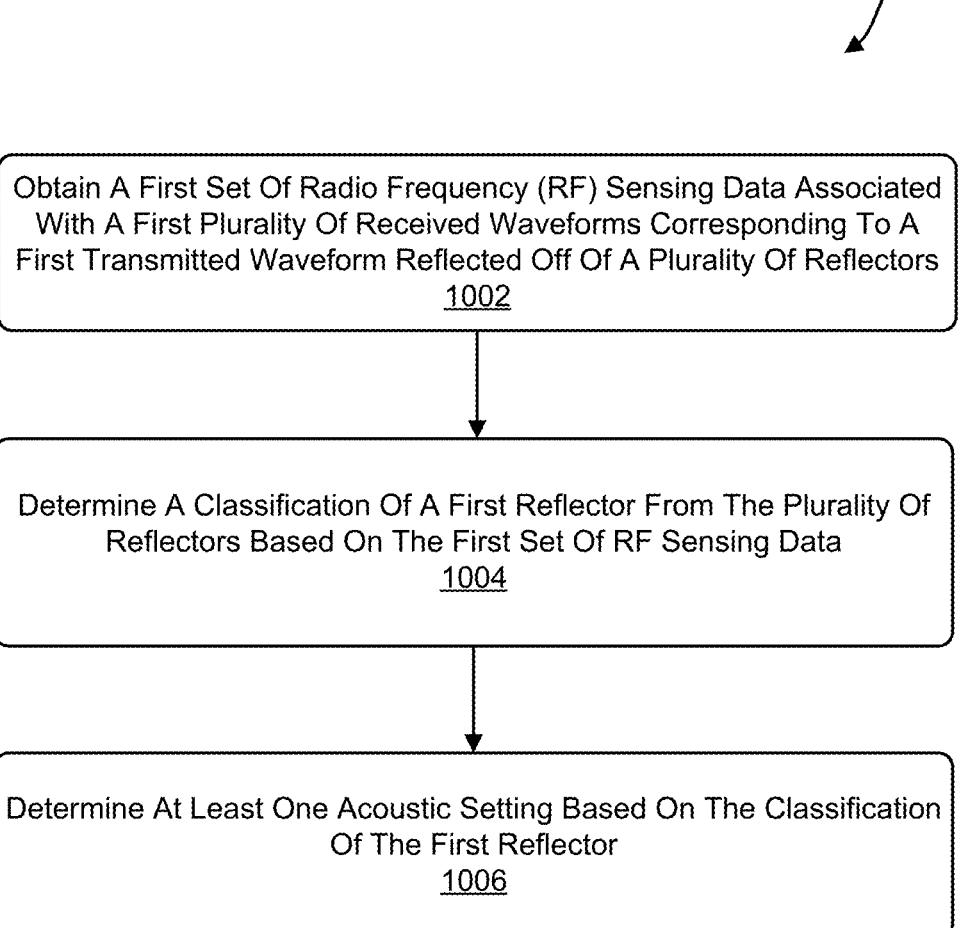

1000

Obtain A First Set Of Radio Frequency (RF) Sensing Data Associated With A First Plurality Of Received Waveforms Corresponding To A First Transmitted Waveform Reflected Off Of A Plurality Of Reflectors
1002

Determine A Classification Of A First Reflector From The Plurality Of Reflectors Based On The First Set Of RF Sensing Data
1004

Determine At Least One Acoustic Setting Based On The Classification Of The First Reflector
1006

FIG. 10

ACOUSTIC CONFIGURATION BASED ON RADIO FREQUENCY SENSING

FIELD OF THE DISCLOSURE

The present disclosure generally relates to configuring acoustic settings of an electronic device. Aspects of the disclosure relate to systems and techniques for using radio frequency (RF) sensing to detect audio sources and/or configure acoustic settings.

BACKGROUND OF THE DISCLOSURE

Electronic devices are capable of providing sophisticated acoustic features such as voice and/or speech recognition. In some cases, users can recite audio instructions which can be used to control the electronic device. For example, users can speak to the electronic devices to initiate or control an application, such as playing music or requesting directions to a destination.

In order to implement various telecommunications functions, electronic devices can include hardware and software components that are configured to transmit and receive radio frequency (RF) signals. For example, a wireless device can be configured to communicate via Wi-Fi, 5G/New Radio (NR), Bluetooth™, and/or ultra-wideband (UWB), among others.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for configuring acoustic settings of an electronic device. According to at least one example, a method is provided for configuring acoustic settings of an electronic device. The method can include: obtaining a first set of radio frequency (RF) sensing data associated with a first plurality of received waveforms corresponding to a first transmitted waveform reflected off of a plurality of reflectors; determining a classification of a first reflector from the plurality of reflectors based on the first set of RF sensing data; and determining at least one acoustic setting based on the classification of the first reflector.

In another example, a wireless device is provided that includes at least one memory and at least one processor (e.g., configured in circuitry) coupled to the at least one memory. The at least one processor is configured to: obtain a first set of radio frequency (RF) sensing data associated with a first plurality of received waveforms corresponding to a first transmitted waveform reflected off of a plurality of reflectors; determine a classification of a first reflector from the plurality of reflectors based on the first set of RF sensing data; and determine at least one acoustic setting based on the classification of the first reflector.

In another example, a non-transitory computer-readable medium is provided that includes stored thereon at least one instruction that, when executed by one or more processors, cause the one or more processors to: obtain a first set of radio frequency (RF) sensing data associated with a first plurality of received waveforms corresponding to a first transmitted waveform reflected off of a plurality of reflectors; determine a classification of a first reflector from the plurality of reflectors based on the first set of RF sensing data; and determine at least one acoustic setting based on the classification of the first reflector.

In another example, an apparatus is provided. The apparatus includes: means for obtaining a first set of radio frequency (RF) sensing data associated with a first plurality of received waveforms corresponding to a first transmitted waveform reflected off of a plurality of reflectors; means for determining a classification of a first reflector from the plurality of reflectors based on the first set of RF sensing data; and means for determining at least one acoustic setting based on the classification of the first reflector.

In some aspects, the apparatus is or is part of a wireless device, such as mobile device (e.g., a mobile telephone or so-called "smart phone" or other mobile device), a wearable device, an extended reality device (e.g., a virtual reality (VR) device, an augmented reality (AR) device, or a mixed reality (MR) device), an Internet-of-Things (IoT) device, a tablet, a personal computer, a laptop computer, a server computer, a wireless access point, a vehicle or component of a vehicle, or other any other device having an RF interface.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIG. 10 is a flow diagram illustrating another example of a process for configuring acoustic settings based on RF sensing, in accordance with some examples.

DETAILED DESCRIPTION

Figure 1:
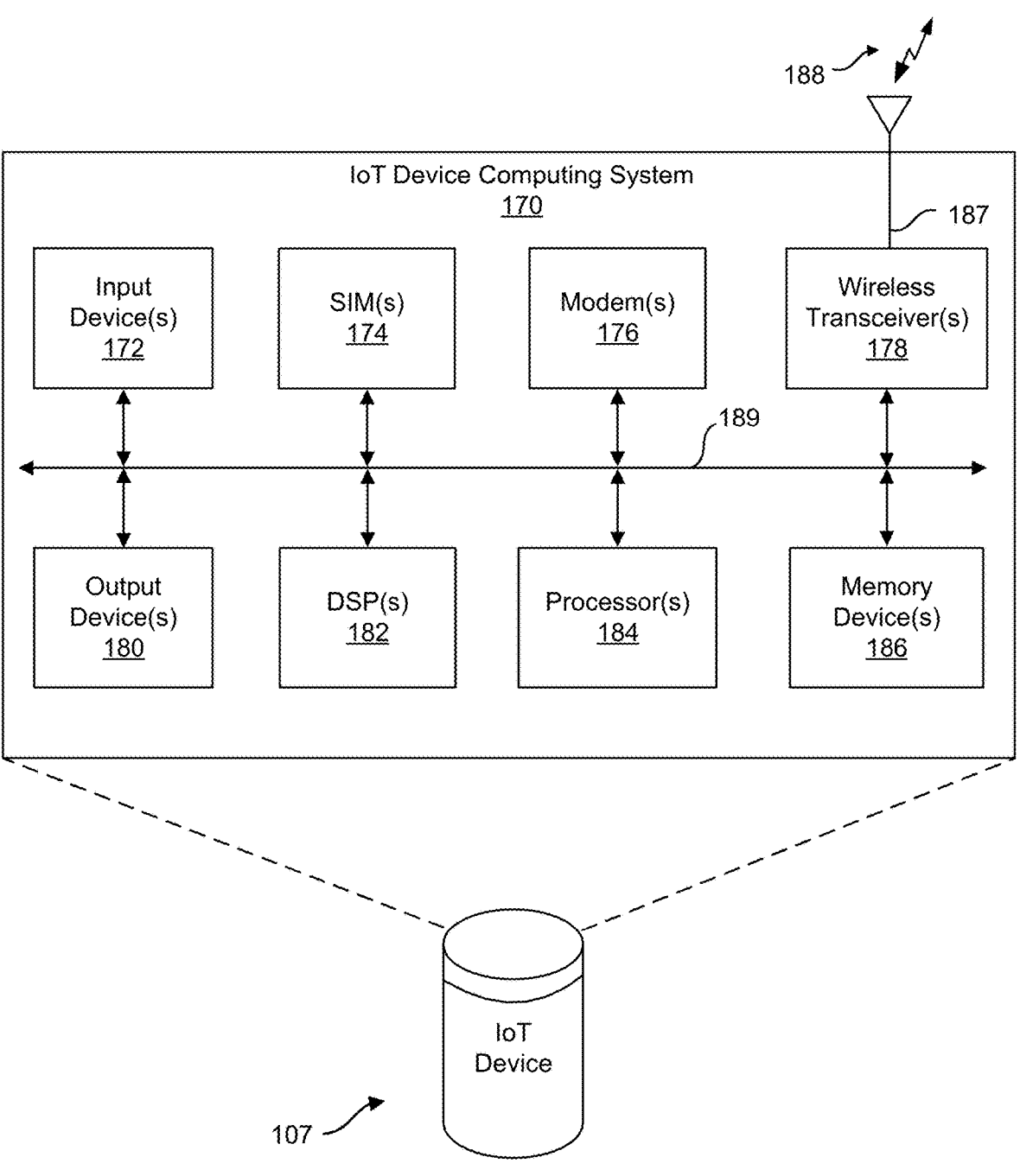
FIG. 1 is a block diagram illustrating an example of a computing system of an electronic device, in accordance with some examples.

Certain aspects and embodiments of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects and embodiments described herein may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Many electronic devices, such as smartphones, tablets, smart speakers, and laptops, are capable of detecting and processing audio signals. In some examples, an electronic device may continuously monitor for a keyword in an audio stream (e.g., the user's speech) that can be used to trigger additional device functionality. For instance, detection of a keyword can be used to enable a processor that is capable of interpreting audio commands from a user. A user can utilize verbal commands to control device functions such as increasing or decreasing volume, launching applications, sending text messages, initiating voice/video calls, etc.

Continuously monitoring for verbal commands from a user can result in higher power consumption and increased processing overhead. In the case of mobile electronic devices, the additional power consumption can result in reduced battery life. Furthermore, the continuous monitoring for verbal commands is often times unnecessary because the user is not in the vicinity of the electronic device.

In addition to the concerns related to high power consumption, proper processing of voice commands can be challenging when the electronic device is located in a noisy environment. For example, an electronic device may be located in a room with a television or radio that is producing sound that may interfere with voice commands from a user. While there are sound filtering algorithms that can be implemented to help alleviate this problem, the effectiveness of such algorithms can be limited by an inability to properly identify and locate the source of the sound interference.

It would be desirable to develop a technique that would permit a device to identify sound sources in order to configure acoustic settings for implementing speech detection and processing. Moreover, it would be desirable to develop a technique that reduces latency in speech recognition while also improving power management to reduce overall power consumption and conserve battery life. Furthermore, it would be desirable to leverage existing radio frequency (RF) interfaces on devices to perform these techniques.

Systems, apparatuses, processes (also referred to as methods), and computer-readable media (collectively referred to as "systems and techniques") are described herein for configuring acoustic settings of an electronic device. The systems and techniques provide the ability for an electronic device to collect RF sensing data that can be used to locate and identify reflectors (e.g., humans, static or dynamic objects, structural elements, etc.) in the surrounding environment. In some aspects, the RF sensing data can be used to develop an acoustic map of the surrounding environment and to identify reflectors that may generate sound and/or affect the propagation of sound waves in the environment. In some examples, the RF sensing data can be used to detect motion (e.g., user movement), determine the presence of a user, determine the orientation of the user's face, identify a user, and/or perform facial authentication.

In some aspects, the RF sensing data can be collected by utilizing wireless interfaces that are capable of simultaneously performing transmit and receive functions (e.g., a monostatic configuration). In other aspects, the RF sensing data can be collected by utilizing a bistatic configuration in which the transmit and receive functions are performed by different devices (e.g., a first wireless device transmits an RF waveform and a second wireless device receives the RF waveform and any corresponding reflections). Examples will be described herein using Wi-Fi as an illustrative example. However, the systems and techniques are not limited to Wi-Fi. For example, in some cases, the systems and techniques can be implemented using 5G/New Radio (NR), such as using millimeter wave (mmWave) technology. In some cases, the systems and techniques can be implemented using other wireless technologies, such as Bluetooth™, ultra-wideband (UWB), among others.

In some examples, a device can include a Wi-Fi interface that is configured to implement algorithms having varying levels of RF sensing resolution based upon a bandwidth of a transmitted RF signal, a number of spatial streams, a number of antennas configured to transmit an RF signal, a number of antennas configured to receive an RF signal, a number of spatial links (e.g., number of spatial streams multiplied by number of antennas configured to receive an RF signal), a sampling rate, or any combination thereof. For example, the Wi-Fi interface of the device can be configured to implement a low-resolution RF sensing algorithm that consumes a small amount of power and can operate in the background when the device is in a "locked" state and/or in a "sleep" mode. In some instances, the low-resolution RF sensing algorithm can be used by the device as a coarse detection mechanism that can sense motion within a certain proximity of the device. In certain aspects, the low-resolution RF sensing algorithm can be used as a trigger to configure acoustic settings on the device (e.g., enable speech detection, configure a spatial sound filter, etc.). In some aspects, the detection of motion by using the low-resolution RF sensing algorithm can trigger the device to perform a higher resolution RF sensing algorithm (e.g., a mid-resolution RF sensing algorithm, a high-resolution RF sensing algorithm, or other higher resolution RF sensing algorithm, as discussed herein) prior to configuring one or more acoustic settings.

In some examples, the device's Wi-Fi interface can be configured to implement a mid-resolution RF sensing algorithm. The transmitted RF signal that is utilized for the mid-resolution RF sensing algorithm can differ from the low-resolution RF sensing algorithm by having a higher bandwidth, a higher number of spatial streams, a higher number of spatial links (e.g., a higher number of antennas configured to receive an RF signal and/or a higher number of spatial streams), a higher sampling rate (corresponding to a smaller sampling interval), or any combination thereof. In some instances, the mid-resolution RF sensing algorithm can be used to detect the presence of a user (e.g., detect head or other body part, such as face, eyes, etc.) as well as motion that is in the device's proximity. In some examples, the mid-resolution RF sensing algorithm can be invoked in response to detecting motion in the proximity of the device by using the low-resolution RF sensing algorithm, as noted above. In certain examples, the mid-resolution RF sensing algorithm can also be used as a trigger to configure acoustic settings on the device (e.g., enable speech detection, configure a spatial sound filter, etc.). In some cases, detecting the presence of the user by using the mid-resolution RF sensing algorithm can trigger the device to perform a higher resolution RF sensing algorithm (e.g., a high-resolution RF sensing algorithm or other higher resolution RF sensing algorithm, as discussed herein) prior to configuring one or more acoustic settings.

In another example, the device's Wi-Fi interface can be configured to implement a high-resolution RF sensing algorithm. The transmitted RF signal that is utilized for the high-resolution RF sensing algorithm can differ from the mid-resolution RF sensing algorithm and the low-resolution RF sensing algorithm by having a higher bandwidth, a higher number of spatial streams, a higher number of spatial links (e.g., a higher number of antennas configured to receive an RF signal and/or a higher number of spatial streams), a higher sampling rate, or any combination thereof. In some instances, the high-resolution RF sensing algorithm can be used to identify a user, to detect the presence of a user, and/or to detect motion in the proximity of the device. In some examples, the high-resolution RF sensing algorithm can be invoked in response to detecting motion in the proximity of the device and/or in response to detecting the presence of the user. In certain cases, the high-resolution RF sensing algorithm can be used as a trigger to configure acoustic settings on the device (e.g., enable speech detection, configure a spatial sound filter, etc.).

In some examples, the systems and techniques can perform RF sensing associated with each of the aforementioned algorithms by implementing a device's Wi-Fi interface having at least two antennas that can be used to simultaneously transmit and receive an RF signal. In some instances, the antennas can be omnidirectional such that RF signals can be received from and transmitted in all directions. For example, a device may utilize a transmitter of its Wi-Fi interface to transmit an RF signal and simultaneously enable a Wi-Fi receiver of the Wi-Fi interface so that the device may receive any reflected signals (e.g., from reflectors such as objects or humans). The Wi-Fi receiver can also be configured to detect leakage signals that are transferred from the Wi-Fi transmitter's antenna to the Wi-Fi receiver's antenna without reflecting from any objects. In doing so, the device may gather RF sensing data in the form of channel state information (CSI) data relating to the direct paths (leakage signals) of the transmitted signal together with data relating to the reflected paths of the signals received that correspond to the transmitted signal.

In some aspects, the CSI data can be used to calculate the distance of the reflected signals as well as the angle of arrival. The distance and angle of the reflected signals can be used to detect motion, determine the presence of a user (e.g., detect face, eyes, feet, hands, etc.), and/or identify the user as discussed above. In some examples, the distance of the reflected signals and the angle of arrival can be determined using signal processing, machine learning algorithms, using any other suitable technique, or any combination thereof. In one example, the distance of the reflected signals can be calculated by measuring the difference in time from reception of the leakage signal to the reception of the reflected signals. In another example, the angle of arrival can be calculated by utilizing an antenna array to receive the reflected signals and measuring the difference in received phase at each element of the antenna array. In some instances, the distance of the reflected signals together with the angle of arrival of the reflected signals can be used to identify presence and orientation characteristics of a user.

In some examples, one or more of the various RF sensing algorithms discussed herein can be used to locate and identify sound sources in the surrounding environment. In some aspects, the RF sensing data can be used to determine the position of the sound sources in order to configure one or more spatial sound filters. In one example, a fixed beamformer can be directed towards a targeted sound source such as a human that is identified using RF sensing techniques. In another example, null beamforming can be directed towards acoustic interfering objects identified using RF sensing techniques (e.g., television, radio, pets, appliances, other humans, etc.).

In some aspects, one or more of the various RF sensing algorithms discussed herein can be used together with acoustic sensing algorithms to locate and identify sound sources in the surrounding environment. In one example, RF sensing data can be used to determine the location and shape of an object, which can be correlated with acoustic sensing data to identify and/or classify the object. In another example, RF sensing data can be used to determine a user identity (e.g., based on shape or characteristics of user body or body parts) that can be correlated with acoustic sensing data corresponding to the user (e.g., voice signature). In some examples, RF sensing data and/or acoustic sensing data can be processed using artificial intelligence and/or machine learning algorithms.

Various aspects of the systems and techniques described herein will be discussed below with respect to the figures. FIG. 1 illustrates an example of a computing system 170 of an Internet-of-Things (IoT) device 107. The IoT device 107 is an example of a device that can include hardware and software for the purpose of connecting and exchanging data with other devices and systems using computer networks (e.g., the internet). For example, the IoT device 107 can include a virtual assistant, smart speaker, smart appliance, mobile phone, router, tablet computer, laptop computer, tracking device, wearable device (e.g., a smart watch, glasses, an XR device, etc.), a vehicle (or a computing device of a vehicle), and/or another device used by a user to communicate over a wireless communications network. In some cases, the device can be referred to as a station (STA), such as when referring to a device configured to communicate using the Wi-Fi standard. In some cases, the device can be referred to as user equipment (UE), such as when referring to a device configured to communicate using 5G/New Radio (NR), Long-Term Evolution (LTE), or other telecommunication standard.

The computing system 170 includes software and hardware components that can be electrically or communicatively coupled via a bus 189 (or may otherwise be in communication, as appropriate). For example, the computing system 170 includes one or more processors 184. The one or more processors 184 can include one or more CPUs, ASICs, FPGAs, APs, GPUs, VPUs, NSPs, microcontrollers, dedicated hardware, any combination thereof, and/or other processing device/s and/or system/s. The bus 189 can be used by the one or more processors 184 to communicate between cores and/or with the one or more memory devices 186.

The computing system 170 may also include one or more memory devices 186, one or more digital signal processors (DSPs) 182, one or more subscriber identity modules (SIMs) 174, one or more modems 176, one or more wireless transceivers 178, one or more antennas 187, one or more input devices 172 (e.g., a camera, a mouse, a keyboard, a touch sensitive screen, a touch pad, a keypad, a microphone or a microphone array, and/or the like), and one or more output devices 180 (e.g., a display, a speaker, a printer, and/or the like).

The one or more wireless transceivers 178 can receive wireless signals (e.g., signal 188) via antenna 187 from one or more other devices, such as other user devices, network devices (e.g., base stations such as eNBs and/or gNBs, WiFi access points (APs) such as routers, range extenders or the like, etc.), cloud networks, and/or the like. In some examples, the computing system 170 can include multiple antennas or an antenna array that can facilitate simultaneous transmit and receive functionality. Antenna 187 can be an omnidirectional antenna such that RF signals can be received from and transmitted in all directions. The wireless signal 188 may be transmitted via a wireless network. The wireless network may be any wireless network, such as a cellular or telecommunications network (e.g., 3G, 4G, 5G, etc.), wireless local area network (e.g., a WiFi network), a Bluetooth™ network, and/or other network. In some examples, the one or more wireless transceivers 178 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end can generally handle selection and conversion of the wireless signals 188 into a baseband or intermediate frequency and can convert the RF signals to the digital domain.

In some cases, the computing system 170 can include a coding-decoding device (or CODEC) configured to encode and/or decode data transmitted and/or received using the one or more wireless transceivers 178. In some cases, the computing system 170 can include an encryption-decryption device or component configured to encrypt and/or decrypt data (e.g., according to the Advanced Encryption Standard (AES) and/or Data Encryption Standard (DES) standard) transmitted and/or received by the one or more wireless transceivers 178.

The one or more SIMs 174 can each securely store an international mobile subscriber identity (IMSI) number and related key assigned to the user of the IoT device 107. The IMSI and key can be used to identify and authenticate the subscriber when accessing a network provided by a network service provider or operator associated with the one or more SIMs 174. The one or more modems 176 can modulate one or more signals to encode information for transmission using the one or more wireless transceivers 178. The one or more modems 176 can also demodulate signals received by the one or more wireless transceivers 178 in order to decode the transmitted information. In some examples, the one or more modems 176 can include a WiFi modem, a 4G (or LTE) modem, a 5G (or NR) modem, and/or other types of modems. The one or more modems 176 and the one or more wireless transceivers 178 can be used for communicating data for the one or more SIMs 174.

The computing system 170 can also include (and/or be in communication with) one or more non-transitory machine-readable storage media or storage devices (e.g., one or more memory devices 186), which can include, without limitation, local and/or network accessible storage, a disk drive, a drive array, an optical storage device, a solid-state storage device such as a RAM and/or a ROM, which can be programmable, flash-updateable and/or the like. Such storage devices may be configured to implement any appropriate data storage, including without limitation, various file systems, database structures, and/or the like.

In various embodiments, functions may be stored as one or more computer-program products (e.g., instructions or code) in memory device(s) 186 and executed by the one or more processor(s) 184 and/or the one or more DSPs 182. The computing system 170 can also include software elements (e.g., located within the one or more memory devices 186), including, for example, an operating system, device drivers, executable libraries, and/or other code, such as one or more application programs, which may comprise computer programs implementing the functions provided by various embodiments, and/or may be designed to implement methods and/or configure systems, as described herein.

In some aspects, the IoT device 107 can include means for performing operations described herein. The means can include one or more of the components of the computing system 170. For example, the means for performing operations described herein may include one or more of input device(s) 172, SIM(s) 174, modems(s) 176, wireless transceiver(s) 178, output device(s) 180, DSP(s) 182, processors 184, memory device(s) 186, and/or antenna(s) 187.

In some aspects, IoT device 107 can include: means for obtaining a first set of radio frequency (RF) sensing data associated with a first plurality of received waveforms corresponding to a first transmitted waveform reflected off of a plurality of reflectors; means for determining a classification of a first reflector from the plurality of reflectors based on the first set of RF sensing data; and means for determining at least one acoustic setting based on the classification of the first reflector. In some examples, the means for obtaining can include the one or more wireless transceivers 178, the one or more modems 176, the one or more SIMs 174, the one or more processors 184, the one or more DSPs 182, the one or more memory devices 186, any combination thereof, or other component(s) of the wireless device. In some examples, the means for determining can include the one or more processors 184, the one or more DSPs 182, the one or more memory devices 186, any combination thereof, or other component(s) of the wireless device.

Figure 2:
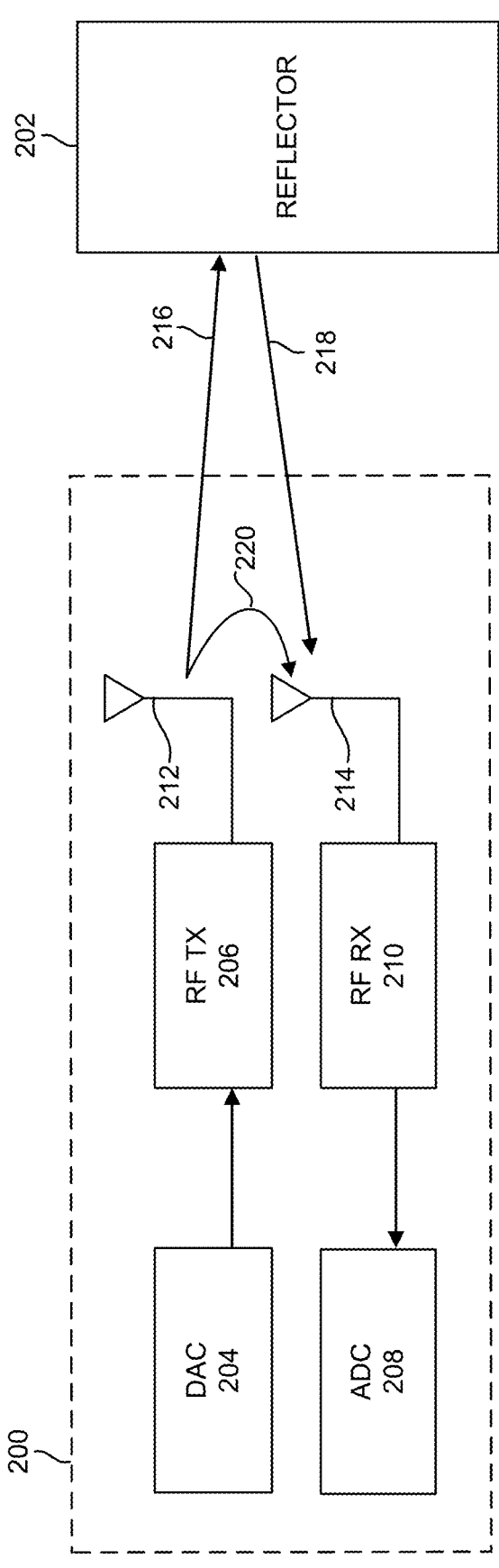
FIG. 2 is a diagram illustrating an example of a wireless device utilizing radio frequency (RF) sensing techniques to detect a reflector, in accordance with some examples.

FIG. 2 is a diagram illustrating an example of a wireless device 200 that utilizes RF sensing techniques to perform one or more functions, such as locating and identifying a reflector 202. In some aspects, reflector 202 can correspond to a human user and the RF sensing techniques can be used to detect motion of a user, detect presence of a user, identify a user, detect orientation characteristics of a user, any combination thereof, and/or perform other functions. In some examples, the wireless device 200 can be the IoT device 107, such as a mobile phone, a tablet computer, a wearable device, or other device that includes at least one RF interface. In some examples, the wireless device 200 can be a device that provides connectivity for a user device (e.g., for IoT device 107), such as a wireless access point (AP), a base station (e.g., a gNB, eNB, etc.), or other device that includes at least one RF interface.

In some aspects, wireless device 200 can include one or more components for transmitting an RF signal. Wireless device 200 can include a digital-to-analog converter (DAC) 204 that is capable of receiving a digital signal or waveform (e.g., from a microprocessor, not illustrated) and converting the signal or waveform to an analog waveform. The analog signal that is the output of DAC 204 can be provided to RF transmitter 206. The RF transmitter 206 can be a Wi-Fi transmitter, a 5G/NR transmitter, a Bluetooth™ transmitter, or any other transmitter capable of transmitting an RF signal.

RF transmitter 206 can be coupled to one or more transmitting antennas such as TX antenna 212. In some examples, TX antenna 212 can be an omnidirectional antenna that is capable of transmitting an RF signal in all directions. For example, TX antenna 212 can be an omni-directional Wi-Fi antenna that can radiate Wi-Fi signals (e.g., 2.4 GHz, 5 GHz, 6 GHz, etc.) in a 360-degree radiation pattern. In another example, TX antenna 212 can be a directional antenna that transmits an RF signal in a particular direction.

In some examples, wireless device 200 can also include one or more components for receiving an RF signal. For example, the receiver lineup in wireless device 200 can include one or more receiving antennas such as RX antenna 214. In some examples, RX antenna 214 can be an omnidirectional antenna capable of receiving RF signals from multiple directions. In other examples, RX antenna 214 can be a directional antenna that is configured to receive signals from a particular direction. In further examples, both TX antenna 212 and RX antenna 214 can include multiple antennas (e.g., elements) configured as an antenna array.

Wireless device 200 can also include an RF receiver 210 that is coupled to RX antenna 214. RF receiver 210 can include one or more hardware components for receiving an RF waveform such as a Wi-Fi signal, a Bluetooth™ signal, a 5G/NR signal, or any other RF signal. The output of RF receiver 210 can be coupled to an analog-to-digital converter (ADC) 208. ADC 208 can be configured to convert the received analog RF waveform into a digital waveform that can be provided to a processor such as a digital signal processor (not illustrated).

In one example, wireless device 200 can implement RF sensing techniques by causing TX waveform 216 to be transmitted from TX antenna 212. Although TX waveform 216 is illustrated as a single line, in some cases, TX waveform 216 can be transmitted in all directions by an omnidirectional TX antenna 212. In one example, TX waveform 216 can be a Wi-Fi waveform that is transmitted by a Wi-Fi transmitter in wireless device 200. In some cases, TX waveform 216 can correspond to a Wi-Fi waveform that is transmitted at or near the same time as a Wi-Fi data communication signal or a Wi-Fi control function signal (e.g., a beacon transmission). In some examples, TX waveform 216 can be transmitted using the same or a similar frequency resource as a Wi-Fi data communication signal or a Wi-Fi control function signal (e.g., a beacon transmission).

In some aspects, TX waveform 216 can correspond to a Wi-Fi waveform that is transmitted separately from a Wi-Fi data communication signal and/or a Wi-Fi control signal (e.g., TX waveform 216 can be transmitted at different times and/or using a different frequency resource).

In some examples, TX waveform 216 can correspond to a 5G NR waveform that is transmitted at or near the same time as a 5G NR data communication signal or a 5G NR control function signal. In some examples, TX waveform 216 can be transmitted using the same or a similar frequency resource as a 5G NR data communication signal or a 5G NR control function signal. In some aspects, TX waveform 216 can correspond to a 5G NR waveform that is transmitted separately from a 5G NR data communication signal and/or a 5G NR control signal (e.g., TX waveform 216 can be transmitted at different times and/or using a different frequency resource).

In some aspects, one or more parameters associated with TX waveform 216 can be modified that may be used to increase or decrease RF sensing resolution. The parameters may include frequency, bandwidth, number of spatial streams, the number of antennas configured to transmit TX waveform 216, the number of antennas configured to receive a reflected RF signal corresponding to TX waveform 216, the number of spatial links (e.g., number of spatial streams multiplied by number of antennas configured to receive an RF signal), the sampling rate, or any combination thereof.

In further examples, TX waveform 216 can be implemented to have a sequence that has perfect or almost perfect autocorrelation properties. For instance, TX waveform 216 can include single carrier Zadoff sequences or can include symbols that are similar to orthogonal frequency-division multiplexing (OFDM) Long Training Field (LTF) symbols. In some cases, TX waveform 216 can include a chirp signal, as used, for example, in a Frequency-Modulated Continuous-Wave (FM-CW) radar system. In some configurations, the chirp signal can include a signal in which the signal frequency increases and/or decreases periodically in a linear and/or an exponential manner.

In some aspects, wireless device 200 can further implement RF sensing techniques by performing concurrent transmit and receive functions. For example, wireless device 200 can enable its RF receiver 210 to receive at or near the same time as it enables RF transmitter 206 to transmit TX waveform 216. In some examples, transmission of a sequence or pattern that is included in TX waveform 216 can be repeated continuously such that the sequence is transmitted a certain number of times or for a certain duration of time. In some examples, repeating a pattern in the transmission of TX waveform 216 can be used to avoid missing the reception of any reflected signals if RF receiver 210 is enabled after RF transmitter 206. In one example implementation, TX waveform 216 can include a sequence having a sequence length L that is transmitted two or more times, which can allow RF receiver 210 to be enabled at a time less than or equal to L in order to receive reflections corresponding to the entire sequence without missing any information.

By implementing simultaneous transmit and receive functionality, wireless device 200 can receive any signals that correspond to TX waveform 216. For example, wireless device 200 can receive signals that are reflected from objects or people that are within range of TX waveform 216, such as RX waveform 218 reflected from reflector 202. Wireless device 200 can also receive leakage signals (e.g., TX leakage signal 220) that are coupled directly from TX antenna 212 to RX antenna 214 without reflecting from any objects. For example, leakage signals can include signals that are transferred from a transmitter antenna (e.g., TX antenna 212) on a wireless device to a receive antenna (e.g., RX antenna 214) on the wireless device without reflecting from any objects. In some cases, RX waveform 218 can include multiple sequences that correspond to multiple copies of a sequence that are included in TX waveform 216. In some examples, wireless device 200 can combine the multiple sequences that are received by RF receiver 210 to improve the signal to noise ratio (SNR).

Wireless device 200 can further implement RF sensing techniques by obtaining RF sensing data associated with each of the received signals corresponding to TX waveform 216. In some examples, the RF sensing data can include channel state information (CSI) data relating to the direct paths (e.g., leakage signal 220) of TX waveform 216 together with data relating to the reflected paths (e.g., RX waveform 218) that correspond to TX waveform 216.

In some aspects, RF sensing data (e.g., CSI data) can include information that can be used to determine the manner in which an RF signal (e.g., TX waveform 216) propagates from RF transmitter 206 to RF receiver 210. RF sensing data can include data that corresponds to the effects on the transmitted RF signal due to scattering, fading, and/or power decay with distance, or any combination thereof. In some examples, RF sensing data can include imaginary data and real data (e.g., I/Q components) corresponding to each tone in the frequency domain over a particular bandwidth.

In some examples, RF sensing data can be used to calculate distances and angles of arrival that correspond to reflected waveforms, such as RX waveform 218. In further examples, RF sensing data can also be used to detect motion, determine location, detect changes in location or motion patterns, obtain channel estimation, or any combination thereof. In some cases, the distance and angle of arrival of the reflected signals can be used to identify the size, position, movement, or orientation of users in the surrounding environment (e.g., reflector 202) in order to detect user presence/proximity, detect user attention, and/or identify a user/object.

Wireless device 200 can calculate distances and angles of arrival corresponding to reflected waveforms (e.g., the distance and angle of arrival corresponding to RX waveform 218) by utilizing signal processing, machine learning algorithms, using any other suitable technique, or any combination thereof. In other examples, wireless device 200 can send the RF sensing data to another computing device, such as a server, that can perform the calculations to obtain the distance and angle of arrival corresponding to RX waveform 218 or other reflected waveforms.

In one example, the distance of RX waveform 218 can be calculated by measuring the difference in time from reception of the leakage signal to the reception of the reflected signals. For example, wireless device 200 can determine a baseline distance of zero that is based on the difference from the time the wireless device 200 transmits TX waveform 216 to the time it receives leakage signal 220 (e.g., propagation delay).

Wireless device 200 can then determine a distance associated with RX waveform 218 based on the difference from the time the wireless device 200 transmits TX waveform 216 to the time it receives RX waveform 218 (e.g., time of flight), which can then be adjusted according to the propagation delay associated with leakage signal 220. In doing so, wireless device 200 can determine the distance traveled by RX waveform 218 which can be used to determine the presence and movement of reflector 202 (e.g., a human, static object, transient object, etc.) that caused the reflection.

In further examples, the angle of arrival of RX waveform 218 can be calculated by measuring the time difference of arrival of RX waveform 218 between individual elements of a receive antenna array, such as antenna 214. In some examples, the time difference of arrival can be calculated by measuring the difference in received phase at each element in the receive antenna array.

In some cases, the distance and the angle of arrival of RX waveform 218 can be used to determine the distance between wireless device 200 and reflector 202 as well as the position of reflector 202 relative to wireless device 200. The distance and the angle of arrival of RX waveform 218 can also be used to determine presence, movement, proximity, attention, identity, or any combination thereof, of a user corresponding to reflector 202. For example, wireless device 200 can utilize the calculated distance and angle of arrival corresponding to RX waveform 218 to determine that a user is walking towards wireless device 200. Based on the proximity of the user (e.g., reflector 202) to wireless device 200, wireless device 200 can configure one or more acoustic device settings (e.g., activate speech recognition, configure spatial sound filter, etc.) In some aspects, acoustic device settings can be implemented based upon reflector 202 being within a threshold distance of wireless device 200.

As noted above, wireless device 200 can include mobile devices (e.g., smartphones, laptops, tablets, etc.) or other types of devices. In some examples, wireless device 200 can be configured to obtain device location data and device orientation data together with the RF sensing data. In some instances, device location data and device orientation data can be used to determine or adjust the distance and angle of arrival of a reflected signal such as RX waveform 218. For example, wireless device 200 may be set on a table facing the ceiling as reflector 202 moves towards it during the RF sensing process. In this instance, wireless device 200 can use its location data and orientation data together with the RF sensing data to determine the direction that the reflector 202 is moving.

In some examples, device position data can be gathered by wireless device 200 using techniques that include round trip time (RTT) measurements, passive positioning, angle of arrival, received signal strength indicator (RSSI), CSI data, using any other suitable technique, or any combination thereof. In further examples, device orientation data can be obtained from electronic sensors on the wireless device 200, such as a gyroscope, an accelerometer, a compass, a magnetometer, a barometer, any other suitable sensor, or any combination thereof.

Figure 3:
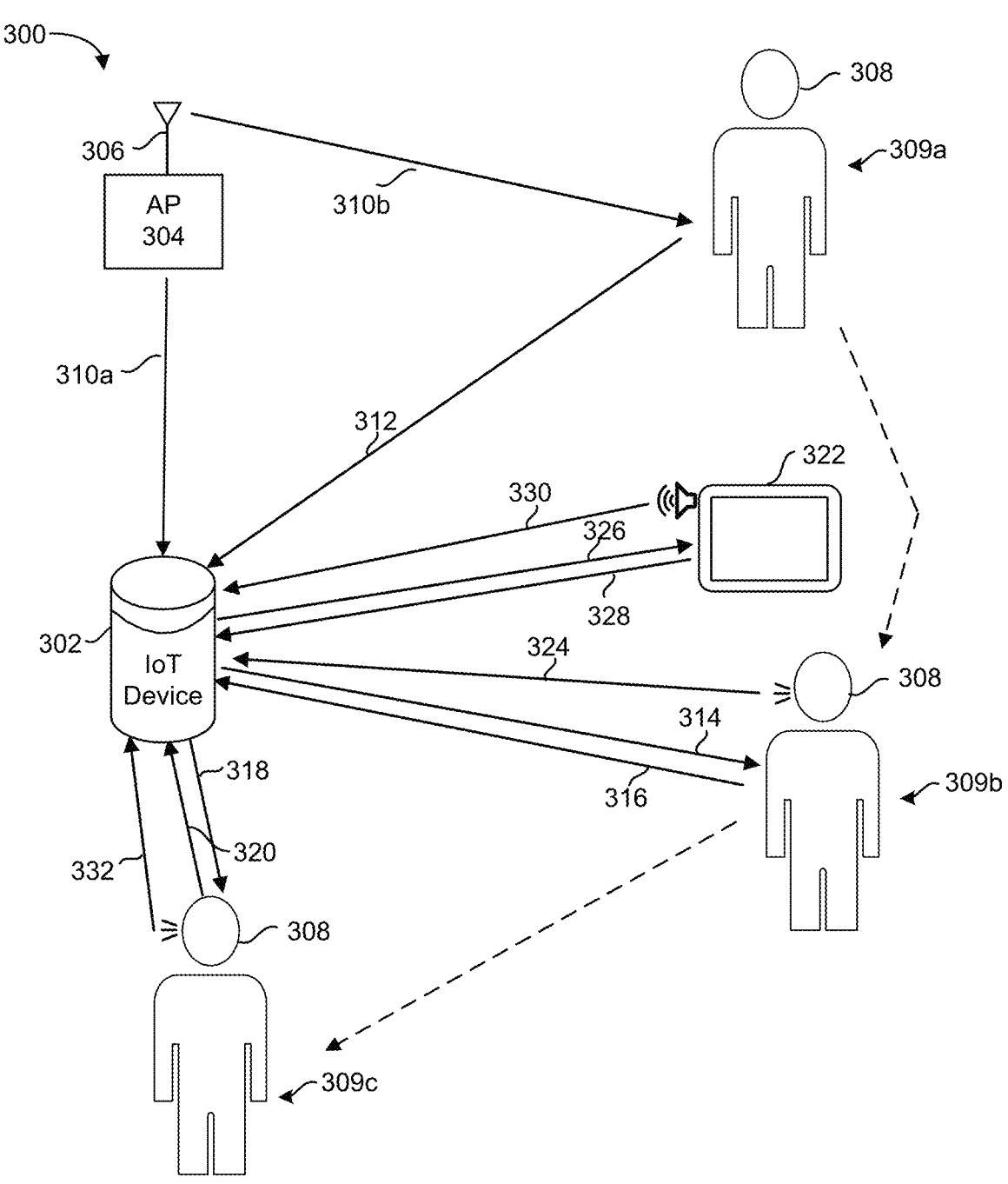
FIG. 3 is a diagram illustrating an example of an environment including wireless devices for detecting audio sources and configuring acoustic settings, in accordance with some examples.

FIG. 3 is a diagram illustrating an environment 300 that includes an IoT device 302, an access point (AP) 304, a user 308, and a television 322. The IoT device 302 can include a user device (e.g., IoT device 107 of FIG. 1, such as a virtual assistant or any other type of device). The AP 304 can also be referred to as a wireless device in some examples. As shown, the user 308 can move to different positions (e.g., with the IoT device 302), including a first user position 309a, a second user position 309b, and a third user position 309c. In some aspects, the IoT device 302 and AP 304 can each be configured to perform RF sensing in order to detect motion, detect human/user presence, identify a user, any combination thereof, and/or perform other functions with respect to the user 308.

In some aspects, AP 304 can be a Wi-Fi access point that includes hardware and software components that can be configured to simultaneously transmit and receive RF signals, such as the components described herein with respect to the wireless device 200 of FIG. 2. For example, AP 304 can include one or more antennas that can be configured to transmit an RF signal and one or more antennas that can be configured to receive an RF signal (e.g., antenna 306). As noted with respect to the wireless device 200 of FIG. 2, AP 304 can include omnidirectional antennas or antenna arrays that are configured to transmit and receive signals from any direction.

In some aspects, the AP 304 and the IoT device 302 can be configured to implement a bistatic configuration in which the transmit and receive functions are performed by different devices. For example, AP 304 can transmit an omnidirectional RF signal that can include signal 310a and signal 310b. As illustrated, signal 310a can travel directly (e.g., no reflections) from AP 304 to IoT device 302 and signal 310b can reflect off of user 308 at position 309a and cause a corresponding reflected signal 312 to be received by IoT device 302.

In some examples, IoT device 302 can utilize RF sensing data associated with signal 310a and signal 310b to determine presence, location, orientation, and/or movement of user 308 at position 309a. For instance, IoT device 302 can obtain, retrieve, and/or estimate location data associated with AP 304. In some aspects, IoT device 302 can use location data associated with AP 304 and RF sensing data (e.g., CSI data) to determine the time of flight, distance, and/or the angle of arrival associated with signals transmitted by AP 304 (e.g., direct path signals such as signal 310a and reflected path signals such as signal 312). In some cases, AP 304 and IoT device 302 can further send and/or receive communication that can include data associated with RF signal 310a and/or reflected signal 312 (e.g., transmission time, sequence/pattern, time of arrival, angle of arrival, etc.).

In some examples, the IoT device 302 can be configured to perform RF sensing using a monostatic configuration, in which case the IoT device 302 performs both the transmit and receive functions (e.g., simultaneous TX/RX discussed in connection with wireless device 200). For instance, IoT device 302 can detect a presence or movement of user 308 at position 309b by transmitting RF signal 314, which can cause a reflected signal 316 from user 308 at position 309b to be received by IoT device 302.

In some aspects, IoT device 302 can obtain RF sensing data associated with reflected signal 316. For example, RF sensing data can include CSI data corresponding to reflected signal 316. In further aspects, IoT device 302 can use the RF sensing data to calculate a distance and an angle of arrival corresponding to reflected signal 316. For instance, IoT device 302 can determine distance by calculating a time of flight for reflected signal 316 based on the difference between a leakage signal (not illustrated) and reflected signal 316. In further examples, IoT device 302 can determine an angle of arrival by utilizing an antenna array to receive the reflected signals and measuring the difference in received phase at each element of the antenna array.

In some examples, IoT device 302 can obtain RF sensing data in the form of CSI data that can be used to formulate a matrix that is based on the number of frequencies represented as 'K' (e.g., tones) and the number of antenna array elements represented as 'N'. In one technique, the CSI matrix can be formulated according to the relationship given by equation (1):

$$\text{CSI Matrix: } H=[h_{ik}], \ i=1, \ldots ,N, \ k=1, \ldots ,K \tag{1}$$

Upon formulating the CSI matrix, IoT device 302 can calculate the angle of arrival and time of flight for direct signal paths (e.g., leakage signals), as well as reflected signal paths (e.g., reflected signal 316) by utilizing a Two-Dimensional Fourier transform. In one example, a Fourier transform can be defined by the relationship given by equation (2) below, in which K corresponds to a number of tones in the frequency domain; N corresponds to a number of receive antennas; $h_{ik}$ corresponds to CSI data captured on the ith antenna and kth tone (e.g., a complex number having a real and an imaginary component); $f_0$ corresponds to a carrier frequency; 1 corresponds to an antenna spacing; c corresponds to the speed of light; and $\Delta f$ corresponds to a frequency spacing between two adjacent tones. The relationship of equation (2) is provided as follows:

$$F(\theta, d) = \sum_{i=1}^{N} \sum_{k=1}^{K} h_{ik} e^{j\frac{2\pi f_0 i l \sin\theta}{c}} e^{j\frac{2\pi dk\Delta f}{c}} \tag{2}$$

In some cases, IoT device 302 can utilize the distance and an angle of arrival corresponding to reflected signal 316 to detect a presence or movement of user 308 at position 309b. In some aspects, IoT device 302 can use RF sensing to detect and identify an object such as television 322. For example, IoT device 302 can transmit RF signal 326, which can cause a reflected signal 328 from television 322 to be received by IoT device 302.

In some aspects, IoT device 302 can configure one or more device settings (e.g., acoustic settings) by using RF sensing techniques to detect and/or identify objects in its environment such as user 308 and television 322. In some cases, IoT device 302 can enable speech recognition software and/or hardware based on detecting presence, movement, or identification of user 308. For example, IoT device 302 can enable hardware and/or software that continuously monitors for a keyword from a user. In another example, IoT device 302 can enable hardware and/or software that detects and processes speech from a user without detection of a keyword. In some aspects, IoT device 302 can implement different speech recognition algorithms based on movement, position, orientation, and/or identification of user 308.

In some examples, IoT device 302 can implement one or more spatial sound filters (e.g., beamformers) that can be used to process audio signals based on the direction from which the audio signals are received. For example, a fixed beamformer can be implemented that combines audio signals originating from a preferred direction constructively (e.g., fixed beamformer can be used to amplify preferred signals). In another example, a null beamformer (e.g., a blocking matrix) can be implemented that combines audio signals originating from a non-preferred direction destructively (e.g., null beamformer can be used to attenuate interfering signals). In some cases, audio signals can be received using two or more microphones on IoT device 302 (e.g., a microphone array as described with respect to input devices 172).

In some examples, IoT device 302 can use RF sensing to determine the location of user 308 (e.g., position 309b) and configure a fixed beamformer that can be used to amplify audio signals originating from user 308. For example, RF sensing data can be used to determine a distance and an angle of arrival corresponding to signals reflected from user 308 (e.g., reflected signal 316). In some cases, the distance and angle of arrival of reflected RF signals can be used to configure a fixed beamformer that amplifies audio signal 324 from user 308. In some aspects, location information obtained using RF sensing techniques can be used to implement a fixed beamformer before audio signal 324 from user 308 is detected. In other aspects, location information obtained using RF sensing techniques can be used to configure and/or adjust a fixed beamformer after audio signal 324 from user 308 is detected.

In some examples, IoT device 302 can use RF sensing to identify television 322 and to determine the location of television 322. In some aspects, IoT device 302 can classify television 322 as an acoustic interfering object (e.g., an object that produces sound that can interfere with detecting and processing speech from user 308). In some examples, IoT device 302 can attenuate interfering audio from television 322 by implementing a null beamformer that is directed towards the position of television 322 that was obtained using RF sensing techniques. In some aspects, location information obtained using RF sensing techniques can be used to implement a null beamformer before audio signal 330 from television 322 is detected. In other aspects, location information obtained using RF sensing techniques can be used to configure and/or adjust a null beamformer after audio signal 330 from television 322 is detected.

In some cases, IoT device 302 can use RF sensing to identify two or more sound sources that are in proximity of each other. For example, IoT device 302 can determine that user 308 at position 309b is in close proximity to television 322. In some examples, proximity of two sound sources can cause interference that degrades speech recognition (e.g., audio signal 330 from television 322 can interfere with the reception and processing of audio signal 324 from user 308).

In some examples, IoT device 302 can provide instructions or feedback to user 308 that can be used to improve reception and processing of speech. For instance, IoT device 302 can instruct user 308 to move closer to IoT device 302. In another example, IoT device 302 can determine that user 308 is facing away from IoT device 302 and can instruct user 308 to turn towards IoT device 302. In another example, IoT device 302 can determine that an interfering sound source is near user 308 and IoT device 302 can instruct user 308 to move away from the interfering sound source (e.g., television 322).

In some cases, user 308 can move away from television 322 to a third position 309c. IoT device 302 can use RF sensing to detect movement of user 308 by transmitting additional signals that cause reflections from user 308. For example, IoT device 302 can transmit RF signal 318 that causes reflected signal 320 from user 308 at position 309c. Based on the RF sensing data associated with reflected signal 320, IoT device 302 can determine the presence of user 308 at position 309c, detect the user's orientation, and identify user 308.

In some aspects, IoT device 302 can configure and/or adjust a fixed beamformer based on RF sensing data corresponding to signals reflected from user 308 at position 309c. In some examples, a fixed beamformer can be used to receive and process audio signal 332 from user 308 at position 309c. In some aspects, a null beamformer can be implemented that attenuates audio signal 330 from television 322 when user 308 is at position 309c.

In some implementations, IoT device 302 may utilize artificial intelligence or machine learning algorithms to perform motion detection, object classification, and/or identification of user 308. In some examples, the machine learning techniques can include supervised machine learning techniques such as those that utilize neural networks, linear and logistics regression, classification trees, support vector machine, any other suitable supervised machine learning technique, or any combination thereof. For instance, a dataset of sample RF sensing data can be selected for training of the machine learning algorithms or artificial intelligence.

In some aspects, IoT device 302 and AP 304 can perform RF sensing techniques irrespective of their association with each other or with a Wi-Fi network. For example, IoT device 302 can utilize its Wi-Fi transmitter and Wi-Fi receiver to perform RF sensing as discussed herein when it is not associated with any access point or Wi-Fi network. In further examples, AP 304 can perform RF sensing techniques regardless of whether it has any wireless devices associated with it.

In some cases, AP 304 can perform RF sensing and provide RF sensing data to IoT device 302. For example, AP 304 can implement RF sensing techniques to determine that user 308 is at position 309a. In some cases, AP 304 can send the RF sensing data corresponding to user 308 at position 309a to IoT device 302. In some examples, AP 304 can use the RF sensing data to determine that user 308 is in position 309a, and AP 304 can send data that indicates the position of user 308 to IoT device 302. In some aspects, IoT device 302 can use RF sensing data and/or position data received from another wireless device (e.g., AP 304) to implement one or more spatial sound filters.

Figure 4:
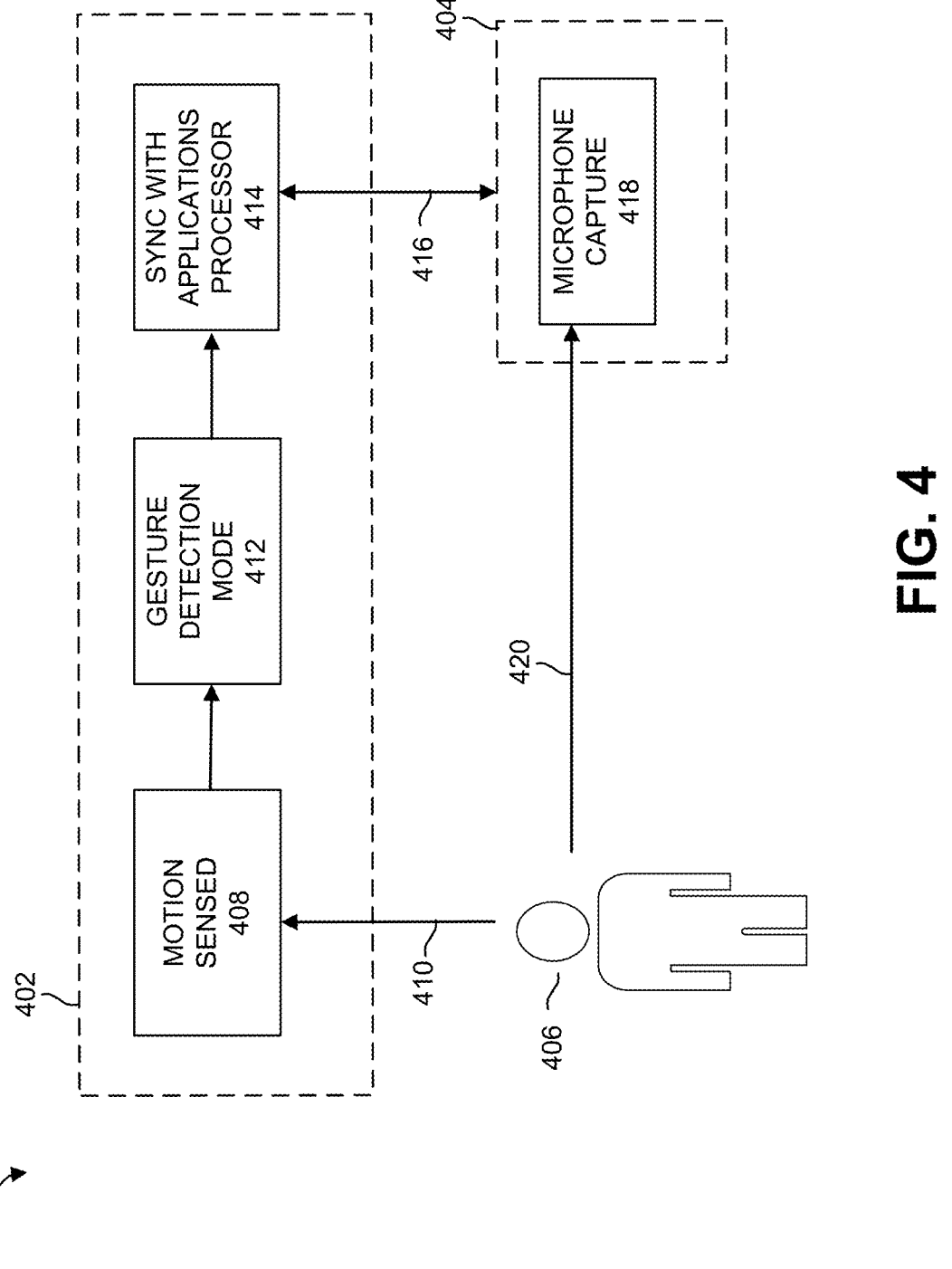
FIG. 4 is a diagram illustrating an example of an environment including wireless devices for detecting human presence and enabling audio detection, in accordance with some examples.

FIG. 4 is a diagram illustrating an environment 400 that includes an RF sensing device 402, an IoT device 404, and a user 406. In some examples, RF sensing device can correspond to a device having one or more RF interfaces (e.g., Wi-Fi, 5G/NR, Bluetooth™) that can be configured to perform RF sensing (e.g., IoT device 107, wireless device 200). In some aspects, IoT device 404 can correspond to a device having one or more microphones that can be configured to perform one or more audio functions (e.g., virtual assistant, speech recognition, etc.). In some cases, RF sensing device 402 and IoT device 404 can correspond to the same device.

In some examples, RF sensing device 402 can implement RF sensing techniques to detect user 406. For example, RF sensing device 402 can receive one or more reflected RF waveforms (e.g., reflected waveform 410) to determine a presence, a movement, and/or an identity corresponding to user 406. In some cases, RF sensing device 402 can use RF sensing data to sense motion 408 of user 406.

In some examples, motion or movement of user 408 can be used by RF sensing device 402 to determine that user 408 intends to engage with IoT device 418. For example, RF sensing device 402 may use RF sensing data to determine that user 408 is walking towards IoT device 404. In some aspects, IoT device 404 can include an audio detection device that can be in an off or disabled state in order to conserve power or battery life. In some cases, the audio detection device in IoT device 404 can be enabled in response to movement of user 408. In some examples, the audio detection device can correspond to a low-power integrated circuit (IC) that is configured to detect one or more keywords from user 408. In some cases, the audio detection device can correspond to a microprocessor (e.g., an applications processor or a digital signal processor) that can be configured to detect, capture, store, and/or process audio 420 from user 408.

In some aspects, RF sensing device 402 can implement a gesture detection mode 412. In some examples, gesture detection mode 412 can be enabled in response to movement of user 406. For example, RF sensing can enable gesture detection mode 412 in response to determining that user 406 is within a threshold distance of RF sensing device 402 and/or IoT device 404. In some cases, gesture detection mode 412 can be implemented together with, or as an alternative to motion sensing 408.

In some examples, motion sensing 408 and/or gesture detection mode 412 can be implemented by a microprocessor (e.g., a digital signal processor (DSP), an applications processor (AP), an application-specific integrated circuit (ASIC)) that can be configured to process the RF sensing data. In some cases, RF sensing data can be processed by RF sensing device 402 and/or RF sensing data can be sent to a server (e.g., cloud) for processing.

In some examples, gesture detection mode 412 can use RF sensing data to identify one or more gestures by user 406. In some cases, user 406 may perform a gesture using a limb, hand, face, or other body part that can be used to indicate that user 406 intends to engage with IoT device 418. For example, RF sensing device 402 may use RF sensing data to determine that user 408 has performed a gesture that is intended to enable IoT device 404.

As noted above, IoT device 404 can include an audio detection device that can be enabled in response to movement of user 408 or in response to a gesture of user 408. In some examples, RF sensing device 402 and IoT device 404 can communicate using link 416. In some examples, link 416 can be implemented using wireless communications such as WiFi, Bluetooth™, 5G/NR, or any other suitable wireless protocol. In some cases, RF sensing device 402 can use link 416 to send a signal or message to IoT device 418 that enables hardware and/or software to perform speech recognition of audio 420 from user 406.

In some aspects, the audio detection device on IoT 404 can be configured to receive one or more commands from user 406 that can be used to control RF sensing device 402. For example, IoT device 404 may capture and process one or more keywords from user 406 that can be used to enable gesture detection mode 412 (e.g., using link 416). In some examples, RF sensing device 402 can implement a standby or ready mode in response to sensing motion 408 of user 406. In some cases, RF sensing device 402 can maintain the standby or ready mode while continuing to sense motion of user 406. In some aspects, IoT device 404 can cause RF sensing device 402 to perform gesture detection mode 412 in response to a command from user 406.

Figure 5A:
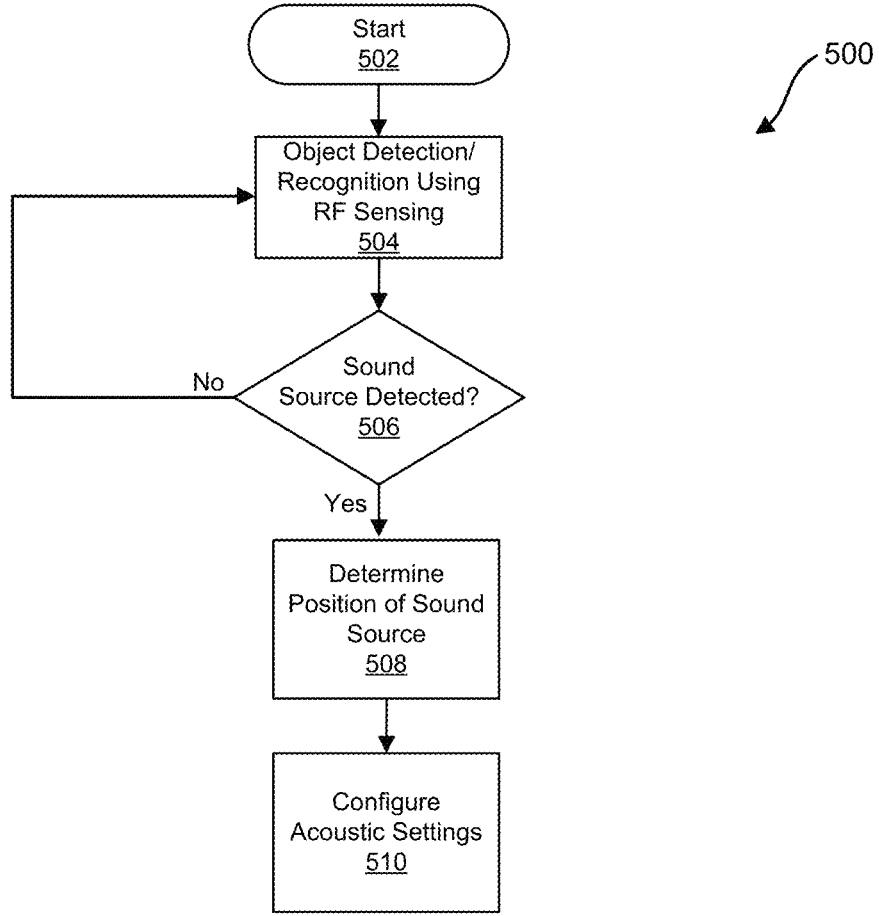
FIG. 5A is a flow diagram illustrating an example of a process for configuring acoustic settings based on RF sensing, in accordance with some examples.

FIG. 5A is a flow diagram illustrating an example of a process 500 for configuring acoustic settings based on RF sensing. The process 500 may begin at operation 502 which can include an electronic device booting up and/or initiating operations relating to RF sensing. At operation 504, an electronic device may perform object detection and recognition using RF sensing. In some aspects, object detection and recognition using RF sensing can include transmitting an RF signal and receiving signals reflected from one or more reflectors in the environment surrounding an electronic device. In some aspects, RF sensing can be implemented using a low-resolution algorithm, a mid-resolution algorithm, or high-resolution algorithm, as discussed further with respect to FIGS. 6, 7, and 8.

In some examples, an electronic device may use RF sensing data associated with one or more reflected signals to determine the distance and angle of arrival of the reflected signals. In some aspects, the distance and angle of arrival of the reflected signals can be used to determine the location, dimensions, shape, orientation, movement, identity, and/or other characteristics associated with one or more reflectors.

In some examples, an electronic device can use RF sensing data to generate a map of an environment (e.g., room, building, house, etc.). In some aspects, the electronic device can further classify reflectors (e.g., humans, pets, static objects, transient objects, structural elements, etc.) within the map of the environment to identify reflectors that may generate sound and/or affect the propagation of sound waves in the environment.

In some aspects, object detection and/or recognition can include detecting and identifying a user (e.g., before a speech command is received). In some cases, RF sensing data can be used to differentiate between an adult and a child (e.g., based on height). In some examples, RF sensing data can be processed and compared with data stored locally on the electronic device or remotely (e.g., on a server) that identifies a user based on one or more physical characteristics (e.g., shape, height, facial characteristics, body part characteristics, etc.).

In some cases, an electronic device may utilize artificial intelligence and/or machine learning algorithms to classify/identify reflectors, identify users, and/or generate the map. In some examples, electronic devices may send and/or receive data (RF sensing data, map data, reflector classifications, etc.) to other electronic devices in order to further develop maps.

At operation 506, the electronic device can determine whether a sound source has been detected based on the RF sensing data. In some examples, a sound source can be a reflector that has been identified which produces sound. For instance, a sound source can include a human, a pet, an electronic device (e.g., television, radio, smart speaker, computer, robot, etc.), an appliance (e.g., refrigerator, dishwasher, air conditioner, vacuum cleaner, etc.), a vehicle, a pool pump, a faucet, a shower, or any other thing that produces sound. If no sound sources are detected, the process 500 can return to operation 504 and perform further object detection and/or recognition using RF sensing.

If a sound source is detected at operation 506, the process can proceed to operation 508 to determine the position of the sound source. In some aspects, the position of the sound source can be determined based on the RF sensing data (e.g., distance and angle of arrival of reflected signals) as described with respect to environment 300. In some examples, the position of the sound source can be obtained based on a map of the indoor environment that is generated using RF sensing data.

At operation 510, the process 500 can include configuring one or more acoustic settings based on the identification and/or position of sound sources in the environment. In some aspects, configuring acoustic settings can include enabling speech recognition hardware and/or software so that the electronic device can detect voice commands from a user. In some examples, configuring acoustic settings can include implementing spatial sound filters such as a beamformer. For example, the position of a reflector classified as a sound source can be used to implement a fixed beamformer and/or a null beamformer. In some aspects, a fixed beamformer can be used to amplify audio signals originating from a preferred direction (e.g., the location of a human user). In some examples, a null beamformer can be used to attenuate audio signals originating from non-preferred directions (e.g., location of acoustic interfering objects). In some aspects, a beamformer can be implemented using a Generalized Sidelobe Canceller (GSC) configuration. In some examples, parameters associated with a beamformer (e.g., filter initialization weights, blocking matrix, etc.) can be configured based on RF sensing data. In some cases, configuring acoustic settings can include initialization of acoustic echo cancellation (AEC) algorithm based on RF sensing data.

In some cases, configuring acoustic settings can include initiating one or more parameters for a cloud-based application. For example, based on the identification of a user, an electronic device may communicate with a cloud-based music streaming service to establish user specific parameters (e.g., load "premium" user options versus "normal" user options; load custom playlist corresponding to user; etc.). In another example, detecting user presence in a particular environment can be used to trigger a cloud-based service that controls an Internet-of-Things device (e.g., turn on a light in room). In another example, an electronic device may disable content and/or applications that are not appropriate for particular users (e.g., disable access to videos or music that are inappropriate for children). In another example, configuring acoustic settings can include loading a targeted language model corresponding to the user for automatic speech recognition.

Figure 5B:
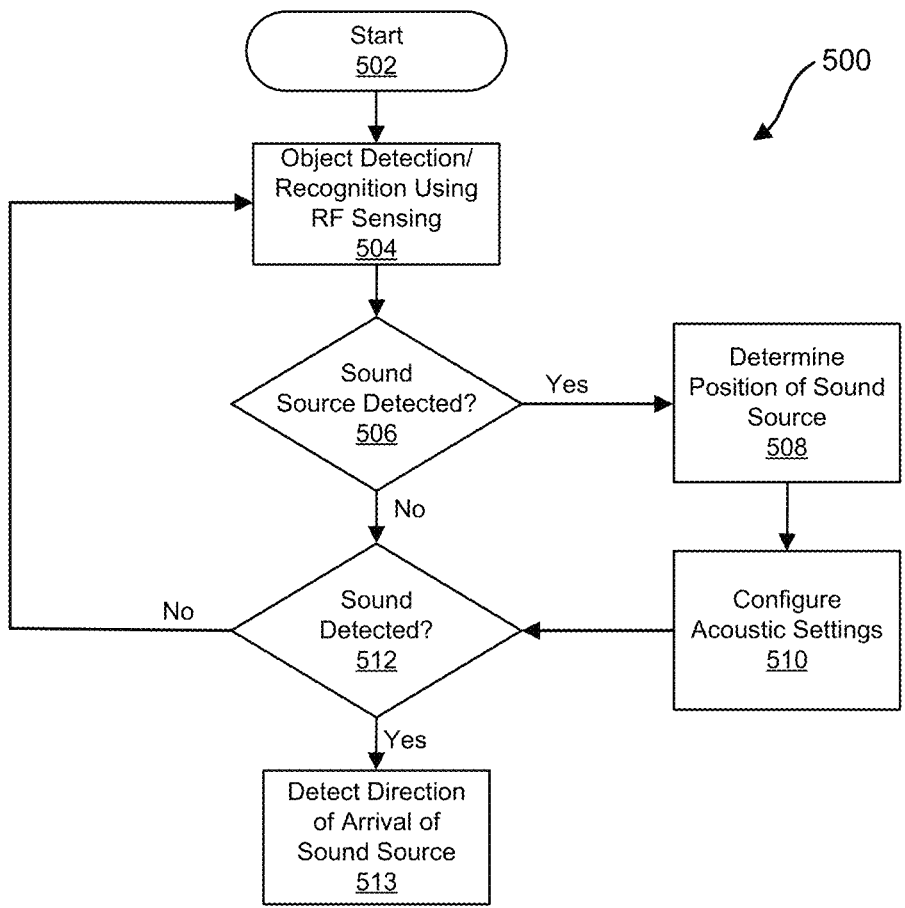
FIG. 5B is a flow diagram illustrating another example of a process for configuring acoustic settings based on RF sensing, in accordance with some examples.

FIG. 5B is a flow diagram illustrating another example of a process 500 for configuring acoustic settings based on RF sensing. The process 500 may begin at operation 502 which can include an electronic device booting up and/or initiating operations relating to RF sensing. At operation 504, an electronic device may perform object detection and recognition using RF sensing. As noted above, object detection and recognition using RF sensing can include transmitting an RF signal and receiving signals reflected from one or more reflectors in the environment surrounding an electronic device, and can be implemented using a low-resolution algorithm, a mid-resolution algorithm, or high-resolution algorithm, as discussed further with respect to FIGS. 6, 7, and 8.

At operation 506, the electronic device can determine whether a sound source has been detected based on the RF sensing data. In some examples, a sound source can be a reflector that has been identified which produces sound. For instance, a sound source can include a human, a pet, an electronic device (e.g., television, radio, smart speaker, computer, robot, etc.), an appliance (e.g., refrigerator, dishwasher, air conditioner, vacuum cleaner, etc.), a vehicle, a pool pump, a faucet, a shower, or any other thing that produces sound. If no sound sources are detected, the process 500 can proceed to operation 512 in which the electronic device monitors for sound (e.g., using one or more microphones). If no sound is detected, the process 500 can return to operation 504 and perform further object detection and/or recognition using RF sensing.

If a sound source is detected at operation 506, the process can proceed to operation 508 to determine the position of the sound source. In some aspects, the position of the sound source can be determined based on the RF sensing data (e.g., distance and angle of arrival of reflected signals) as described with respect to environment 300. In some examples, the position of the sound source can be obtained based on a map of the indoor environment that is generated using RF sensing data.

At operation 510, the process 500 can include configuring one or more acoustic settings based on the identification and/or position of sound sources in the environment. As noted above, in some aspects, configuring acoustic settings can include enabling speech recognition hardware and/or software, implementing spatial sound filters, initiating parameters for one or more applications, and/or configuring any other device setting.

At operation 512, the electronic device can monitor for a sound. If a sound is detected, the process 500 can proceed to operation 513 and detect the direction of arrival of the audio signals. In some aspects, a microphone array can be configured to receive one or more audio signals. In some cases, the direction of arrival of an audio signal can be determined based on a time difference of arrival (TDOA) between two or more sensors (e.g., microphones). In some examples, the direction of arrival of audio signals can be used to configure or adjust acoustic settings (e.g., acoustic settings described with respect to operation 510).

Figure 5C:
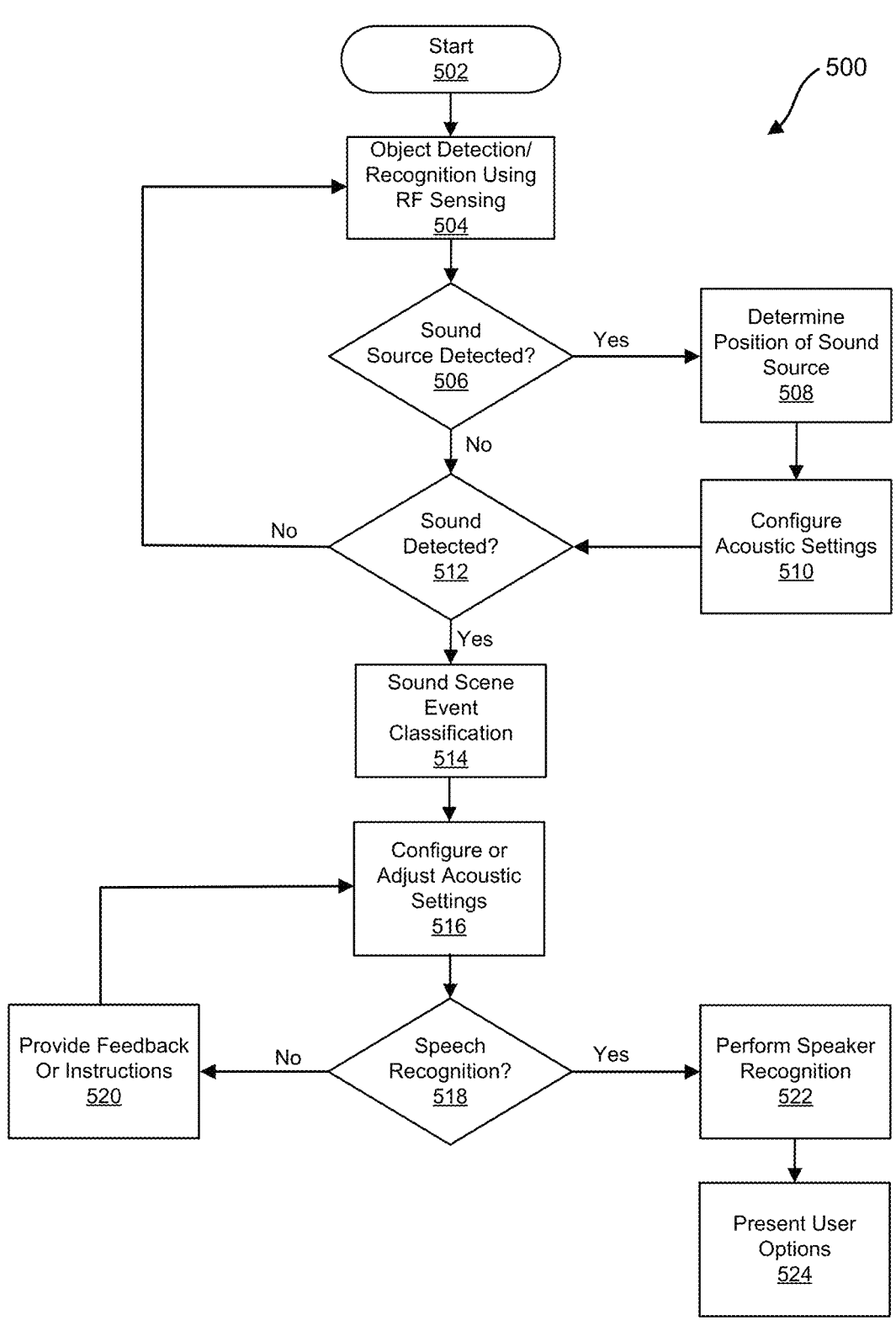
FIG. 5C is a flow diagram illustrating another example of a process for configuring acoustic settings based on RF sensing, in accordance with some examples.

FIG. 5C is a flow diagram illustrating another example of a process 500 for configuring acoustic settings based on RF sensing. The process 500 may begin at operation 502 which can include an electronic device booting up and/or initiating operations relating to RF sensing. At operation 504, an electronic device may perform object detection and recognition using RF sensing. As noted above, object detection and recognition using RF sensing can include transmitting an RF signal and receiving signals reflected from one or more reflectors in the environment surrounding an electronic device, and can be implemented using a low-resolution algorithm, a mid-resolution algorithm, or high-resolution algorithm, as discussed further with respect to FIGS. 6, 7, and 8.

At operation 506, the electronic device can determine whether a sound source has been detected based on the RF sensing data. In some examples, a sound source can be a reflector that has been identified which produces sound. For instance, a sound source can include a human, a pet, an electronic device (e.g., television, radio, smart speaker, computer, robot, etc.), an appliance (e.g., refrigerator, dishwasher, air conditioner, vacuum cleaner, etc.), a vehicle, a pool pump, a faucet, a shower, or any other thing that produces sound. If no sound sources are detected, the process 500 can proceed to operation 512 in which the electronic device monitors for sound (e.g., using one or more microphones). If no sound is detected, the process 500 can return to operation 504 and perform further object detection and/or recognition using RF sensing.

If a sound source is detected at operation 506, the process can proceed to operation 508 to determine the position of the sound source. In some aspects, the position of the sound source can be determined based on the RF sensing data (e.g., distance and angle of arrival of reflected signals) as described with respect to environment 300. In some examples, the position of the sound source can be obtained based on a map of the indoor environment that is generated using RF sensing data.

At operation 510, the process 500 can include configuring one or more acoustic settings based on the identification and/or position of sound sources in the environment. As noted above, in some aspects, configuring acoustic settings can include enabling speech recognition hardware and/or software, implementing spatial sound filters, initiating parameters for one or more applications, and/or configuring any other device setting.

At operation 512, the electronic device can monitor for a sound. If a sound is detected, the process 500 can proceed to operation 514 and perform sound scene event classification. In some aspects, sound scene event classification can include determining a distance and angle of arrival associated with one or more received audio signals. In some examples, the distance and angle of arrival associated with received audio signals can be used to identify and/or classify sound sources. In some cases, the data obtained using sound scene classification can be processed, combined, and/or correlated to object detection and identification performed using RF sensing. In one illustrative example, RF sensing may identify an object having a size and shape corresponding to a television, and sound scene analysis (e.g., based on audio signal received from location of object) can be used to confirm that the object is a television. In another illustrative example, RF sensing may identify a particular user based on certain characteristics (e.g., height, shape, facial features, body parts, etc.), and sound scene analysis (e.g., based on audio signal received from location of user) can be used to associate audio signal characteristics (e.g., a voice signature) with the physical user characteristics.

In some aspects, sound scene event classification can include identifying objects or structural elements in the environment that affect sound propagation. For example, electronic device can determine that an audio signal is experiencing a high reverberation level based on multiple audio signal reflections that are caused by one or more reflectors in the environment. In some examples, wireless device can identify the reflectors causing reverberations by calculating the angle of arrival of audio signals and comparing with location of reflectors identified using RF sensing. For example, the angle of arrival and/or time of flight associated with an audio signal can be used to determine that a reflector such as a piece of furniture or a wall that was identified using RF sensing is causing the audio reflections. In some aspects, acoustic settings can be adjusted to filter audio signals corresponding to reverberations.

In some examples, sound scene event classification can include receiving audio signals from multiple audio sources and determining spatial separation between the audio sources. For example, electronic device may receive a first audio signal corresponding to a user (e.g., audio signal 324) and a second audio signal corresponding to an acoustic interfering object (e.g., audio signal 330). In some cases, position and/or spatial separation of the sound sources can be determined by processing the audio signals (e.g., angle of arrival and/or time of flight). Data obtained from the audio signals can be combined with RF sensing data to further classify reflectors and/or develop map of environment.

At operation 516, the process 500 can include configuring or adjusting acoustic settings (e.g., based on sound scene event classification). In some examples, configuring or adjusting acoustic settings can include implementing a fixed beamformer and/or a null beamformer. In some examples, data obtained using sound scene classification may identify an audio source that was not identified using RF sensing and that is interfering with a desired audio signal. In this instance, a null beamformer can be configured to help suppress signals associated with the interfering audio source. In another example, data obtained using sound scene classification can be used to further refine the location of a sound source and adjust the parameters (e.g., filter coefficients) associated with a fixed beamformer.

At operation 518, the process 500 includes a determination as to whether speech was recognized by the electronic device. If speech was not recognized, the process 500 can proceed to operation 520 in which the electronic device can provide feedback or instructions relating to speech recognition. In some aspects, the feedback can be related to interfering sound sources identified by the electronic device (e.g., based on sound scene classification and/or RF sensing). Referring to FIG. 3, the electronic device can determine that audio signal 330 from television 322 is interfering with audio signal 324 from user 308 at position 309b. In some examples, the electronic device may provide instructions to the user regarding the interfering sound source. For example, the electronic device may instruct the user to "please move to the left so that I can understand you better" or "please move away from the television."

In some examples, the electronic device may determine that a second electronic device is better situated (e.g., closer to user) to perform speech recognition. For example, the electronic device may be coupled to a smart speaker that is located in a different room which may be closer to the user, as determined using location data obtained with RF sensing. In some aspects, the electronic device may send a signal to the second electronic device to enable speech recognition. In some cases, the electronic device may provide an instruction to the user indicating that the user should direct attention to the second electronic device (e.g., "please turn your head towards smart assistant with blinking light."). After providing instructions or feedback at operation 520, the process can return to operation 516 to configure or adjust acoustic settings (e.g., adjust beamforming parameters based on user movement).

If speech is recognized at operation 518, the process 500 can proceed to operation 522 to perform speaker recognition. In some aspects, speaker recognition can be performed by processing the audio signal received from the user by using digital signal processing, machine learning algorithms, artificial intelligence algorithms, using any other suitable technique, or any combination thereof. In some cases, speaker recognition can include associating the speaker with one or more RF sensing characteristics that can also be used to identify the user. In some examples, speaker recognition can also include modification of beamforming parameters based on data associated with the user's voice.

At operation 524, the process includes presenting user options (e.g., options associated with the identified user). In some examples, presenting user options can include presenting a dialog that corresponds to a user profile (e.g., device parameters, application settings, etc.). In some aspects, user options can be presented based on a detected environment or a detected activity. For example, an electronic device (e.g., mobile phone) may determine that a smart speaker is located in the same room as the user and present an option to stream music to the smart speaker.

Figure 6:
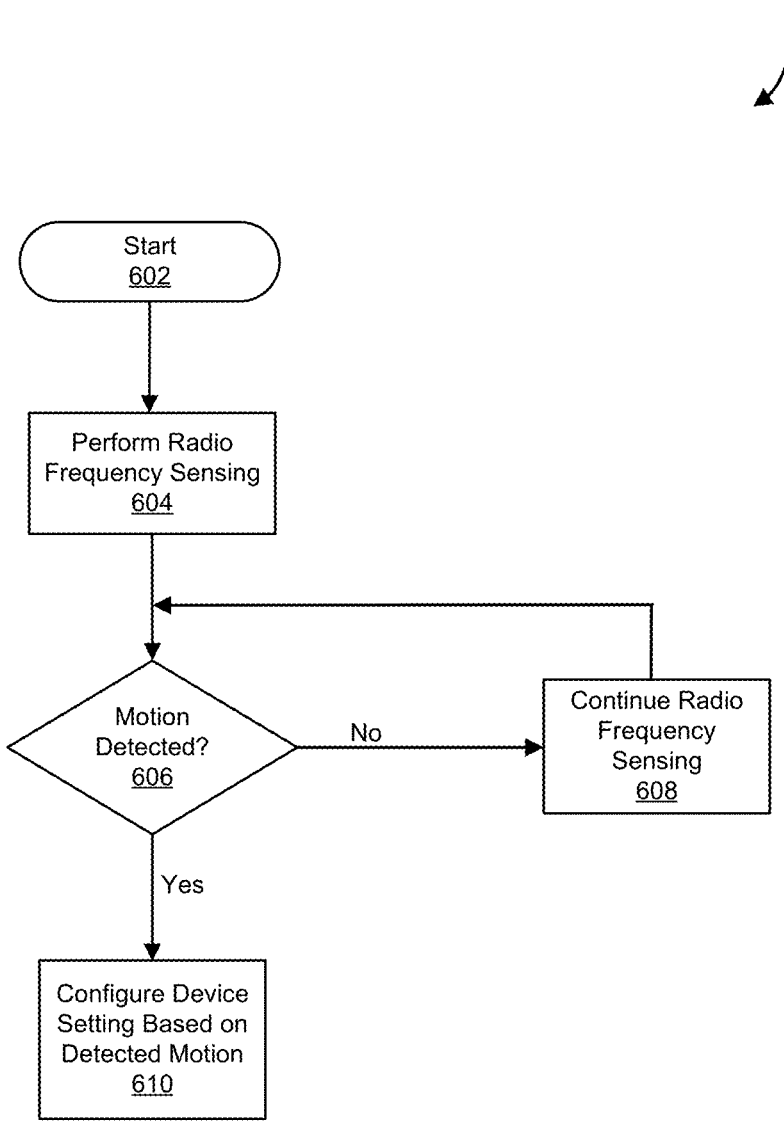
FIG. 6 is a flow diagram illustrating another example of a process for configuring acoustic settings based on RF sensing, in accordance with some examples.

FIG. 6 is a flow diagram illustrating an example of a process 600 for configuring acoustic settings based on motion detected with RF sensing. The process 600 may begin at operation 602 which can include an electronic device booting up and/or initiating operations relating to RF sensing. In some aspects, the electronic device may be in a locked state and the screen (or display) of the device is off.

At operation 604, the device can perform RF sensing in order to detect motion within a proximity of the device. In one example, RF sensing to detect motion can be implemented by configuring an RF interface on the device to perform simultaneous transmit and receive functions (similar to that described above, such as with respect to the wireless device 200 of FIG. 2). For instance, a Wi-Fi interface on the device can be configured to transmit one or more RF signals and simultaneously (or near simultaneously) receive one or more reflected signals that correspond to the transmitted RF signal.

In some implementations, the device can be configured to implement RF sensing algorithms having varying levels of RF sensing resolution based upon parameters such as the bandwidth of the transmitted RF signal, the number of spatial streams, the number of antennas configured to transmit an RF signal, the number of antennas configured to receive an RF signal, the number of spatial links (e.g., number of spatial streams multiplied by number of antennas configured to receive an RF signal), the sampling rate, or any combination thereof. For example, the device may implement an algorithm that can detect motion in the device's proximity when it is in a locked or sleep state by adjusting one or more parameters relating to bandwidth, sampling rate, and/or spatial links.

For example, in some cases, the device may be configured to transmit using spatial streaming or multiplexing techniques that can be used to transmit independent and separately coded signals (e.g., streams) from each of the transmit antennas. For instance, a wireless device having four antennas can be configured to implement a 1×3 configuration (e.g., one spatial stream and three RX antennas which will result in three spatial links) by configuring one antenna to transmit and configuring the remaining three antennas to receive (e.g., in which case the one TX antenna can transmit a spatial stream that can be received by the other three RX antennas). In another example, the wireless device may implement a 2×2 configuration (e.g., two spatial streams and two RX antennas which will result in four spatial links) by transmitting independent signals via two antennas that are configured to transmit, which can be received by two antennas that are configured to receive.

In some configurations, the device can adjust the level of RF sensing resolution by modifying the number of spatial links (e.g., adjusting number of spatial streams and/or number of receive antennas) as well as the bandwidth and the sampling frequency. In some cases, the device can implement a low-resolution RF sensing algorithm (e.g., with a relatively low bandwidth, low number of spatial links, and low sampling rate), which consumes a small amount of power and can operate in the background when the device is in the locked or sleep state. In one illustrative example, the device can perform motion detection by configuring an RF interface to utilize a single spatial link to transmit a signal having a bandwidth of approximately 20 MHz and by utilizing a sampling rate that can be in the range of 100 ms to 500 ms. Those skilled in the art will understand that the parameters and corresponding values set forth herein are provided as example configurations and that the disclosed systems and techniques may be implemented using different variations of parameters and values.

At operation 606, the device can determine whether motion is detected based on the RF sensing data. The device may detect motion by utilizing signal processing, machine learning algorithms, using any other suitable technique, or any combination thereof. If no motion is detected, the process 600 can proceed to operation 608 in which the device continues to perform RF sensing in order to detect motion. In such cases, the device can continue to perform RF sensing using the low-resolution RF sensing algorithm.

If motion is detected at operation 606, the process 600 can proceed to operation 610 and configure device settings (e.g., acoustic settings) based on detected motion. In some aspects, the detected motion can correspond to a human within a threshold proximity of the device. In some examples, configuring device settings can include enabling speech recognition hardware and/or software when the motion is within a threshold proximity of the device. In some cases, configuring device settings can include implementing a spatial sound filter such as a fixed beamformer or a null beamformer that is directed towards the position of the detected motion.

Figure 7:
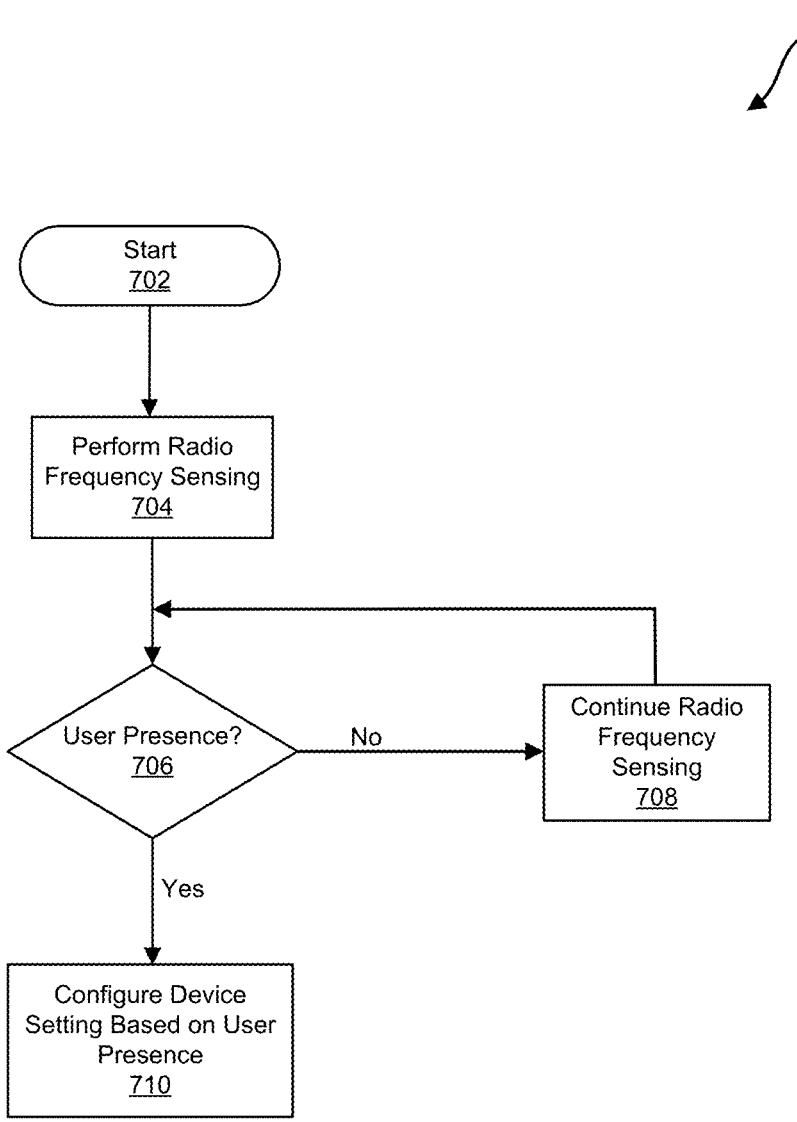
FIG. 7 is a flow diagram illustrating another example of a process for configuring acoustic settings based on RF sensing, in accordance with some examples.

FIG. 7 is a flow diagram illustrating an example of a process 700 for configuring acoustic settings based on user presence detected with RF sensing. The process 700 may begin at operation 702 which can include an electronic device booting up and/or initiating operations relating to RF sensing. In some aspects, the electronic device may be in a locked state and the screen (or display) of the device is off.

At operation 704, the device can perform RF sensing in order to detect the presence of a user within a proximity or a threshold distance of the device. In one example, detecting user presence can include detecting and identifying the presence of a user's body part (e.g., head, leg, arm, torso, etc.). In some implementations, RF sensing to detect user presence can be performed in response to detection of motion, as discussed with respect to process 600. For example, a device may implement RF sensing by using parameters (e.g., bandwidth, sampling rate, spatial streams, spatial links, any combination thereof, and/or other parameters) that provide low-power operation for detection of motion. In response to detecting motion, a device may implement RF sensing using a different set of parameters (e.g., a different bandwidth, a different sampling rate, different spatial streams, different spatial links, etc.) that can be configured for detecting user presence.

In one example, a device that is set on a desk in a room may use the techniques discussed with respect to process 600 to detect that a user is walking around the room, but is not yet in close proximity (e.g., within a threshold distance) to the device. Upon detecting that the user is moving towards the device, the device may implement a different RF sensing algorithm (e.g., according to the process 700 of FIG. 7) that can be configured to detect user presence by detecting a portion of the human body.

RF sensing to detect user presence can be implemented by configuring an RF interface on the device to perform simultaneous transmit and receive functions. For instance, an RF interface on the device can be configured to transmit one or more RF signals and simultaneously receive one or more reflected signals that correspond to the transmitted RF signal.

As noted above, in some implementations, the device can be configured to implement RF sensing algorithms having varying levels of RF sensing resolution based upon parameters such as the bandwidth of the transmitted RF signal, the number of spatial streams, the number of spatial links, the sampling rate, or any combination thereof. For example, the device may implement an algorithm that can detect user presence (e.g., by performing head detection to detect the presence of a head) by adjusting one or more parameters relating to bandwidth, sampling rate, spatial streams, and/or spatial links. In some cases, the device can implement a mid-resolution RF sensing algorithm (e.g., with a medium bandwidth, a medium number of spatial links, and a medium sampling rate as compared to the low-resolution RF sensing algorithm), which can differ from the low-resolution RF sensing algorithm by having a higher bandwidth, a higher number of spatial links, a higher sampling rate, or any combination thereof. For instance, as compared to the parameters used in the process 600 of FIG. 6 to detect motion, the device can increase the bandwidth, increase the sampling rate (to collect more samples), and/or increase the number of spatial links to detect the user presence. In one illustrative example, the device can detect user presence by configuring an RF interface to utilize two spatial links and transmit a signal having a bandwidth of approximately 40 MHz and by utilizing a sampling rate that can be approximately 50 ms. As discussed with respect to process 600, those skilled in the art will understand that the parameters and corresponding values set forth herein are provided as example configurations and that the disclosed systems and techniques may be implemented using different variations of parameters and values.

At operation 706, the device can determine whether user presence is detected based on the RF sensing data. The device may detect user presence by utilizing signal processing, machine learning algorithms, using any other suitable technique, or any combination thereof. If user presence is not detected, the process 700 can proceed to operation 708 in which the device continues to perform RF sensing in order to detect user presence using the process 700 of FIG. 7 or to detect motion using the process 600 of FIG. 6. In such cases, the device can continue to perform RF sensing using the mid-resolution RF sensing algorithm.

If user presence is detected at operation 706, the process 700 can proceed to operation 710 and configure device setting(s) based on user presence. In some aspects, the user presence can be detected within a threshold proximity of the device. In some examples, configuring device settings can include enabling speech recognition hardware and/or software when the user presence is within a threshold proximity of the device. In some cases, configuring device settings can include implementing a spatial sound filter such as a fixed beamformer or a null beamformer that is directed towards the position of user.

Figure 8:
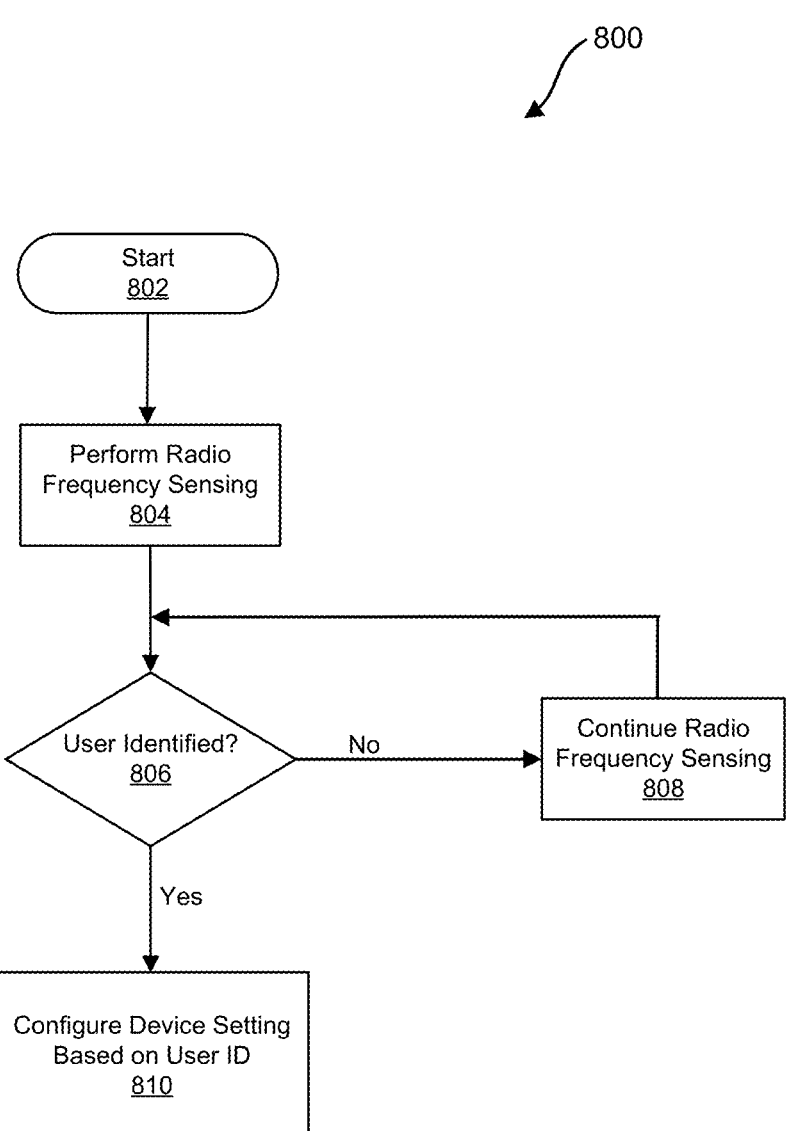
FIG. 8 is a flow diagram illustrating another example of a process for configuring acoustic settings based on RF sensing, in accordance with some examples.

FIG. 8 is a flow diagram illustrating an example of a process 800 for configuring acoustic settings based on user identification detected with RF sensing. The process 800 may begin at operation 802 which can include an electronic device booting up and/or initiating operations relating to RF sensing. In some aspects, the electronic device may be in a locked state and the screen (or display) of the device is off.

At operation 804, the device can perform RF sensing in order to determine an identify of the user. In some implementations, RF sensing to determine user identity can be performed in response to detection of the user's presence, as discussed with respect to process 700. For example, a device may implement RF sensing by using parameters (e.g., bandwidth, sampling rate, spatial streams, spatial links, any combination thereof, and/or other parameters) that are configured to detect user presence (e.g., head presence) while minimizing power consumption. In response to detecting user presence, a device may implement RF sensing using a different set of parameters (e.g., bandwidth, sampling rate, spatial streams, spatial links, any combination thereof, and/or other parameters) that can be configured for determining the identity of the user.

In one example, a device that is set on a desk in a room may use the techniques discussed with respect to the process 700 of FIG. 7 to determine user presence within a threshold proximity to the device. Presence of the user may then trigger RF sensing techniques to identify the user.

RF sensing to determine user identity can be implemented by configuring an RF interface on the device to perform simultaneous transmit and receive functions. For instance, an RF interface on the device can be configured to transmit one or more RF signals and simultaneously receive one or more reflected signals that correspond to the transmitted RF signal.

Similar to that described above, the device can be configured to implement RF sensing algorithms having varying levels of RF sensing resolution based upon parameters such as the bandwidth of the transmitted RF signal, the number of spatial streams, the number of spatial links, the sampling rate, or any combination thereof. For example, the device may implement an algorithm that can detect a user's head orientation when it is in a locked or sleep state by adjusting one or more parameters relating to bandwidth, sampling rate, and/or spatial links. In some cases, the device can implement a high-resolution RF sensing algorithm (e.g., with a high bandwidth, a high number of spatial links, and a high sampling rate as compared to the mid-resolution RF sensing algorithm). The high-resolution RF sensing algorithm can differ from the mid-resolution RF sensing algorithm by having a higher bandwidth, a higher number of spatial links, a higher sampling rate, or any combination thereof. For instance, as compared to the parameters used in the process 700 of FIG. 7 to detect user presence, the device can increase the bandwidth, increase the sampling rate (to collect more samples), and/or increase the number of spatial links to detect the head orientation. In one illustrative example, the device can determine user identity by configuring an RF interface to utilize three or more spatial links, to transmit a signal having a bandwidth of 80-160 MHz, and by utilizing a sampling rate that is less than 50 ms. As discussed with respect to the foregoing processes, those skilled in the art will understand that the parameters and corresponding values set forth herein are provided as example configurations and that the disclosed systems and techniques may be implemented using different variations of parameters and values.

At operation 806, the device can determine whether a user has been identified based on the RF sensing data. The device may determine user identification by utilizing signal processing, machine learning algorithms, using any other suitable technique, or any combination thereof. In some aspects, user identification can be based on user body dimensions, user body shape, user body parts (e.g., hands, arms, legs, head, etc.), and/or any combination thereof. In some examples, RF sensing can detect user characteristics (e.g., body part dimensions) and use the data to distinguish users. In some aspects, authenticated users can utilize a training mode to calibrate dimensions and store them on the device for future authentication (e.g., a newly detected dimension can be compared with pre-stored dimensions of authenticated users to determine user identity). In some examples, a user's calibration data can be used to perform motion tracking and/or hand gesture recognition.

If the device is not able to determine user identity, the process 800 can proceed to operation 808 in which the device remains in a locked state and continues to perform RF sensing in order to detect user identity using the process 800 of FIG. 8, to detect user presence using the process 700 of FIG. 7, or to detect motion using the process 600 of FIG. 6. In such cases, the device can continue to perform RF sensing using the high-resolution RF sensing algorithm.

If the device determines that a user identity at operation 806, the process 800 can proceed to operation 810 and configure device setting(s) based on the user identity. In some examples, configuring device settings can include enabling speech recognition hardware and/or software. In some cases, configuring device settings can include implementing a spatial sound filter such as a fixed beamformer or a null beamformer that is directed towards the position of user. In some aspects, configuring device settings can include initialization of acoustic echo cancellation (AEC) algorithms.

In some examples, configuring device settings can include configuring cloud processing parameters. In some cases, configuring cloud processing parameters can include loading a targeted language model for automatic speech recognition. In some aspects, configuring cloud processing parameters can include initializing a deep neural network (DNN) based on de-noising weights. In some examples, configuring cloud processing parameters can include establishing security or access parameters for cloud based applications based on user identification (e.g., access to "premium" features for music streaming application).

Figure 9:
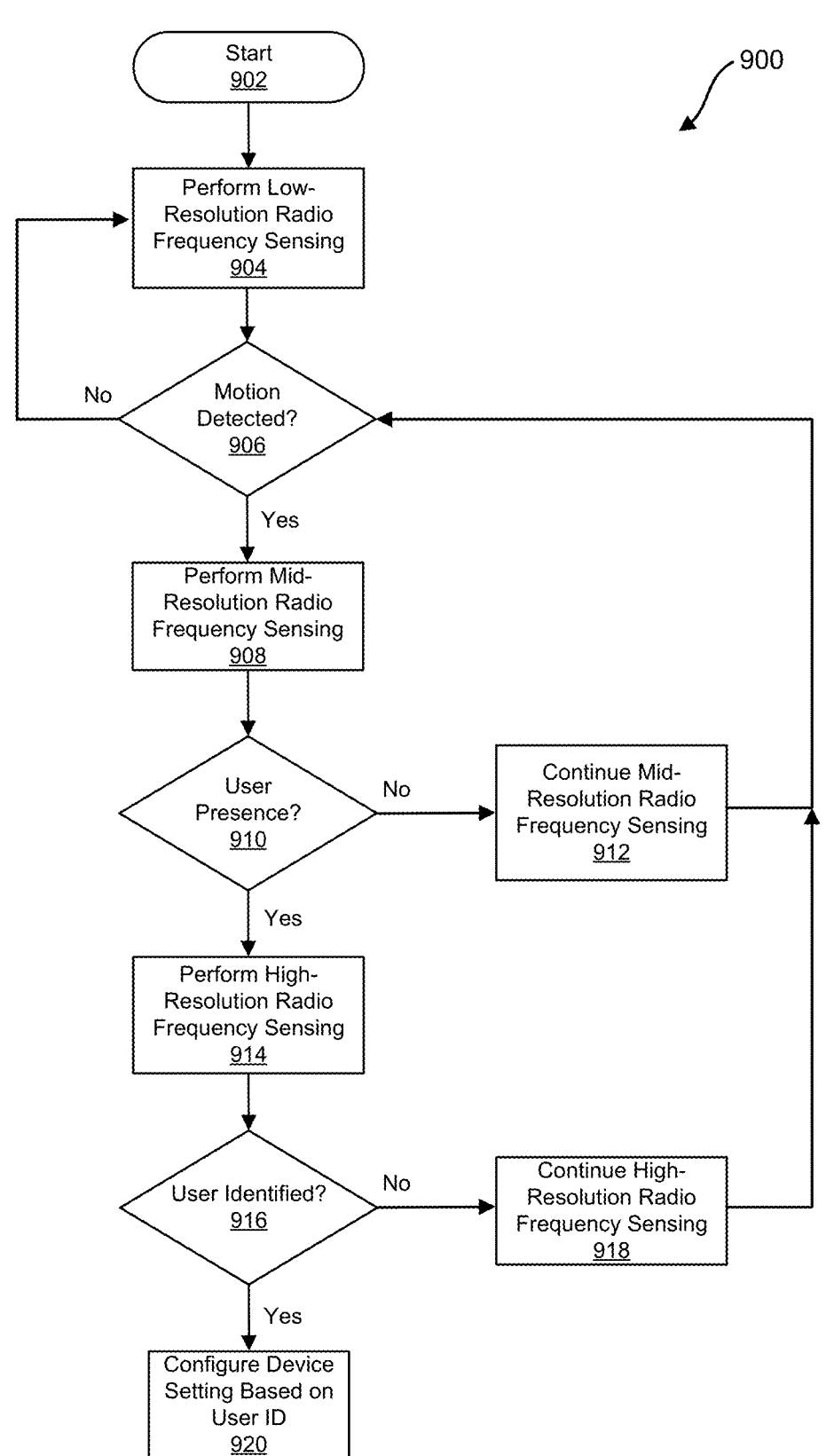
FIG. 9 is a flow diagram illustrating another example of a process for configuring acoustic settings based on RF sensing, in accordance with some examples.

FIG. 9 is a flow diagram illustrating an example of a process 900 for configuring acoustic settings based on RF sensing. The process 900 may begin at operation 902 which can include an electronic device booting up and/or initiating operations relating to RF sensing. Similar to the examples from FIG. 6, FIG. 7, and FIG. 8, a user may have set the device down on a desk and/or the device may have entered a locked state after a certain amount of time of inactivity.

At operation 904, the device can perform a low-resolution RF sensing algorithm in order to detect motion within a proximity of the device (e.g., detect a user walking in the same room as the device). In one example, RF sensing to detect motion can be implemented by configuring an RF interface on the device to perform simultaneous transmit and receive functions (similar to that described above, such as with respect to the wireless device 200 of FIG. 2). For instance, a Wi-Fi interface on the device can be configured to transmit one or more RF signals and simultaneously (or near simultaneously) receive one or more reflected signals that correspond to the transmitted RF signal. In one illustrative example, the low-resolution RF sensing algorithm can be implemented by configuring an RF interface to utilize a single spatial link to transmit a signal having a bandwidth of approximately 20 MHz and by utilizing a sampling rate that can be in the range of 100 ms to 500 ms.

At operation 906, the device can determine whether motion is detected based on the RF sensing data. If no motion is detected, the process 900 can return to operation 904 in which the device continues to perform low-resolution RF sensing in order to detect motion.

If motion is detected at operation 906, the process 900 can proceed to operation 908 and the device can perform a mid-resolution RF sensing algorithm in order to detect the presence of a user. In one example, detecting user presence can include detecting and identifying the presence of a user's head. The mid-resolution RF sensing algorithm can differ from the low-resolution RF sensing algorithm by having a higher bandwidth, a higher number of spatial links, a higher sampling rate, or any combination thereof. In one illustrative example, the device can detect user presence by configuring an RF interface to utilize two spatial links and transmit a signal having a bandwidth of approximately 40 MHz and by utilizing a sampling rate that can be approximately 50 ms.

At operation 910, the device can determine whether user presence is detected based on the RF sensing data. If user presence is not detected, the process 900 can continue to implement a mid-resolution RF sensing algorithm at operation 912. In some examples, the mid-resolution RF sensing algorithm can be used to detect motion at operation 906. If no motion is detected, the process 900 can return to operation 904 in which the device remains in a locked state and continues to perform low-resolution RF sensing in order to detect motion.

If user presence is detected at operation 910, the process 900 can proceed to operation 914 and the device can perform a high-resolution RF sensing algorithm in order to identify the user. The high-resolution RF sensing algorithm can differ from the mid-resolution RF sensing algorithm by having a higher bandwidth, a higher number of spatial links, a higher sampling rate, or any combination thereof. In one illustrative example, the device can detect head orientation by configuring an RF interface to utilize three or more spatial links, to transmit a signal having a bandwidth of 80-160 MHz, and by utilizing a sampling rate that is less than 50 ms.

At operation 916, the device can determine whether the user has been identified based on the RF sensing data (e.g., by comparing body part dimension with pre-stored dimension corresponding to authenticated users). If the user is not identified, the process 900 can continue to implement a high-resolution RF sensing algorithm at operation 918. In some examples, the high-resolution RF sensing algorithm can be used to detect motion at operation 906. If no motion is detected, the process 900 can return to operation 904 in which the device remains in a locked state and continues to perform low-resolution RF sensing in order to detect motion. If the user is identified at operation 916, the process 900 can proceed to operation 920 and configure device settings based on user identification. Device settings can include acoustic device settings, cloud processing parameters, environment settings, etc. as described herein.

FIG. 10 is a flow diagram illustrating an example of a process 1000 for configuring acoustic settings based on RF sensing. At operation 1002, the process 1000 includes obtaining a first set of radio frequency (RF) sensing data associated with a first plurality of received waveforms corresponding to a first transmitted waveform reflected off of a plurality of reflectors. In some examples, a wireless device can include at least one transceiver that can be configured to transmit the first transmitted waveform and/or receive the first plurality of received waveforms. For example, IoT device 107 can obtain RF sensing data by configuring wireless transceivers 178 (e.g., WiFi, Bluetooth™, 5G/NR, etc.) to transmit an RF signal (e.g., the first transmitted waveform) and receive reflections of the transmitted RF signal (e.g., the first plurality of received waveforms). In some aspects, the first transmitted waveform can be transmitted by a second wireless device, such as in an a bistatic configuration in which the transmit and receive functions are performed by different devices (e.g., AP 304 can transmit an RF signal and IoT device 302 can receive the reflections). In some examples, the first set of RF sensing data can correspond to channel state information (CSI) data.

At operation 1002, the process 1000 includes determining a classification of a first reflector from the plurality of reflectors based on the first set of RF sensing data. At operation 1004, the process 1000 includes determining at least one acoustic setting based on the classification of the first reflector. In some examples, the process can include determining a distance and an angle of arrival between a wireless device and the first reflector based on the first set of RF sensing data. For example, IoT device 302 can use RF sensing data to determine a distance and an angle of arrival between IoT device 302 and television 322.

In some aspects, a device may use the RF sensing data to determine a position of the first reflector and configure a spatial sound filter directed to the position of the first reflector, wherein the spatial sound filter corresponds to the at least one acoustic setting. In some cases, the classification of the first reflector can correspond to a human and the spatial sound filter can correspond to a fixed beamformer. For instance, IoT device 302 can use RF sensing data to determine positon 309c of user 308 and can configure a fixed beamformer that is directed to position 309c.

In some examples, the classification of the first reflector can correspond to an acoustic interfering object and the spatial sound filter can correspond to a null beamformer. For example, IoT device 302 can use RF sensing data to determine a position of television 322 and can attenuate interfering audio from television 322 by implementing a null beamformer that is directed towards the position of television 322.

In some aspects, a device may include a plurality of microphones that can be used to receive a first audio signal from the first reflector. In some examples, the device may determine a direction of arrival associated with the first audio signal and adjust the spatial sound filter based on the direction of arrival associated with the first audio signal. For example, IoT device 302 may receive audio signal 332 from user 308 and determine the direction of arrival of audio signal 332. In some cases, IoT device 302 may use the direction of arrival of audio signal 332 to adjust a spatial sound filter.

In some examples, the process can include determining, based on the RF sensing data, a proximity of a second reflector from the plurality of reflectors to the first reflector and providing, based on a configuration of the spatial sound filter, an instruction for moving at least one of the first reflector or the second reflector. For instance, IoT device 302 can determine a proximity of television 322 and user 308 at position 309b. In some cases, IoT device can instruct user 308 to move to position 309c.

In some aspects, a device may include an audio detection device, wherein to determine the at least one acoustic setting, the process can include enabling the audio detection device from an idle mode in response to determining that the classification of the first reflector corresponds to an object that is capable of producing sound, wherein the audio detection device is configured to receive speech input, and providing an indication that the audio detection device is ready to receive speech input based on the object that is capable of producing sound being detected. In some examples, the object that is capable of producing sound can correspond to a human, a robot, an electronic device, or some other object that is capable of producing sound. For example, IoT device 404 can include an audio detection device (e.g., applications processor, low-power integrated circuit) that can be configured to receive speech input. In some cases, speech input can correspond to a keyword or command that can be used to enable further speech recognition. In some example, speech input can correspond to any audio signals from user 406. In some examples, RF sensing device 402 can use RF sensing to determine that a reflector corresponds to an object that is capable of producing sound, such a human (e.g., user 406) and can enable an audio detection device in IoT 416. In some cases, IoT 404 can provide an indication (e.g., play an alert or sound, vibrate, turn on an LED, etc.) that IoT 404 is ready to receive speech input.

In some examples, the process can include, in response to determining that the classification of the first reflector corresponds to a human, obtaining a second set of RF sensing data associated with a second plurality of received waveforms corresponding to a second transmitted waveform reflected off of the plurality of reflectors, wherein the second transmitted waveform has a higher bandwidth than the first transmitted waveform. In some aspects, the second set of RF sensing data can be used to determine an identity associated with the human. For example, a device such as IoT 107 can implement a mid-resolution RF sensing algorithm (e.g. operation 908) or a high-resolution RF sensing algorithm (e.g, operation 914) to determine user presence and/or user identity. In some examples, the at least one device acoustic setting is associated with the identity corresponding to the human and includes at least one of a device acoustic parameter, a local application parameter, a remote application parameter, an environmental parameter, or any combination thereof.

In some cases, the second set of RF sensing data can be used to determine a movement of the human. In some examples, the process can include determining that the human is within a threshold distance of an audio device and sending a signal to enable the audio device. For instance, RF sensing device 402 can determine that user 406 is moving and is within a threshold distance of IoT device 404. In some examples, RF sensing device 402 can send a signal (e.g., via link 416) to enable IoT device 404.

In some examples, the processes described herein (e.g., processes 500, 600, 700, 800, 900, 1000 and/or other process described herein) may be performed by a computing device or apparatus (e.g., a UE). In one example, the process 900 can be performed by the IoT device 107 of FIG. 1. In another example, the process 900 can be performed by a computing device with the computing system 1100 shown in FIG. 11. For instance, a computing device with the computing architecture shown in FIG. 11 can include the components of the IoT device 107 of FIG. 1 and can implement the operations of FIG. 10.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces can be configured to communicate and/or receive wired and/or wireless data, including data according to the 3G, 4G, 5G, and/or other cellular standard, data according to the WiFi (802.11x) standards, data according to the Bluetooth™ standard, data according to the Internet Protocol (IP) standard, and/or other types of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 900 is illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 900 and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 11:
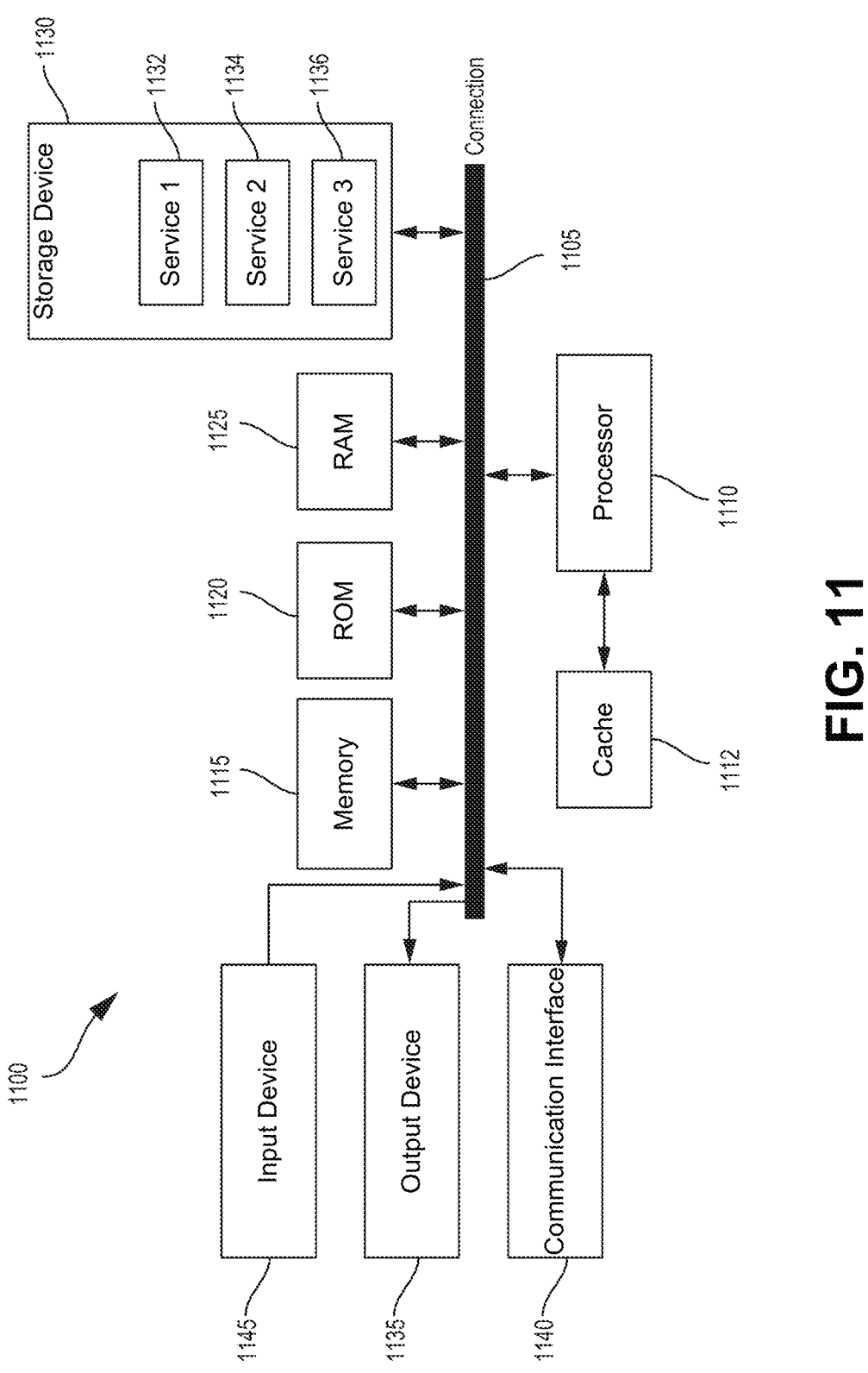
FIG. 11 is a block diagram illustrating an example of a computing system, in accordance with some examples.

FIG. 11 is a diagram illustrating an example of a system for implementing certain aspects of the present technology. In particular, FIG. 11 illustrates an example of computing system 1100, which can be for example any computing device making up internal computing system, a remote computing system, a camera, or any component thereof in which the components of the system are in communication with each other using connection 1105. Connection 1105 can be a physical connection using a bus, or a direct connection into processor 1110, such as in a chipset architecture. Connection 1105 can also be a virtual connection, networked connection, or logical connection.

In some embodiments, computing system 1100 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1100 includes at least one processing unit (CPU or processor) 1110 and connection 1105 that communicatively couples various system components including system memory 1115, such as read-only memory (ROM) 1120 and random access memory (RAM) 1125 to processor 1110. Computing system 1100 can include a cache 1112 of high-speed memory connected directly with, in close proximity to, or integrated as part of processor 1110.

Processor 1110 can include any general purpose processor and a hardware service or software service, such as services 1132, 1134, and 1136 stored in storage device 1130, configured to control processor 1110 as well as a special-purpose processor where software instructions are incorporated into the actual processor design. Processor 1110 may essentially be a completely self-contained computing system, containing multiple cores or processors, a bus, memory controller, cache, etc. A multi-core processor may be symmetric or asymmetric.

To enable user interaction, computing system 1100 includes an input device 1145, which can represent any number of input mechanisms, such as a microphone for speech, a touch-sensitive screen for gesture or graphical input, keyboard, mouse, motion input, speech, etc. Computing system 1100 can also include output device 1135, which can be one or more of a number of output mechanisms. In some instances, multimodal systems can enable a user to provide multiple types of input/output to communicate with computing system 1100.

Computing system 1100 can include communications interface 1140, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 1140 may also include one or more range sensors (e.g., light detection and ranging (LIDAR) sensors, laser range finders, radars, ultrasonic sensors, and infrared (IR) sensors) configured to collect data and provide measurements to processor 1110, whereby processor 1110 can be configured to perform determinations and calculations needed to obtain various measurements for the one or more range sensors. In some examples, the measurements can include time of flight, wavelengths, azimuth angle, elevation angle, range, linear velocity and/or angular velocity, or any combination thereof. The communications interface 1140 may also include one or more Global Navigation Satellite System (GNSS) receivers or transceivers that are used to determine a location of the computing system 1100 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1130 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 1130 can include software services, servers, services, etc., that when the code that defines such software is executed by the processor 1110, it causes the system to perform a function. In some embodiments, a hardware service that performs a particular function can include the software component stored in a computer-readable medium in connection with the necessary hardware components, such as processor 1110, connection 1105, output device 1135, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the embodiments and examples provided herein, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some embodiments the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices.

Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, micro-controller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to (" ") and greater than or equal to (">") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

As used herein, "integrated" may include "manufactured or sold with". A device may be integrated if a user buys a package that bundles or includes the device as part of the package. In some descriptions, two devices may be coupled, but not necessarily integrated (e.g., different peripheral devices may not be integrated to a device, but still may be "coupled"). Another example, may be the any of the transceivers or antennas described herein that may be "coupled" to a processor, but not necessarily part of the package that includes a device. Other examples may be inferred from the context disclosed herein, including this paragraph, when using the term "integrated".

As used herein, "provide" may include "sending", e.g. one or more processors may provide an output signal or signals to another component, may equivalently mean, the one or more processors may send the output signal or signals to another component.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative aspects of the disclosure include:

Aspect 1: A wireless device, comprising: at least one memory; and at least one processor coupled to the at least one memory and configured to: obtain a first set of radio frequency (RF) sensing data associated with a first plurality of received waveforms corresponding to a first transmitted waveform reflected off of a plurality of reflectors; determine a classification of a first reflector from the plurality of reflectors based on the first set of RF sensing data; and determine at least one acoustic setting based on the classification of the first reflector.

Aspect 2: The wireless device according to aspect 1, wherein the at least one processor is further configured to: determine a position of the first reflector based on the first set of RF sensing data; and configure a spatial sound filter directed to the position of the first reflector, wherein the spatial sound filter corresponds to the at least one acoustic setting.

Aspect 3: The wireless device according to any one of aspects 1 to 2, wherein the classification of the first reflector corresponds to a human and the spatial sound filter corresponds to a fixed beamformer.

Aspect 4: The wireless device according to any one of aspects 1 to 2, wherein the classification of the first reflector corresponds to an acoustic interfering object and the spatial sound filter corresponds to a null beamformer.

Aspect 5: The wireless device according to any one of aspects 1 to 4, further comprising a plurality of microphones coupled to the at least one processor, wherein the at least one processor is further configured to: receive, via the plurality of microphones, a first audio signal from the first reflector; determine a direction of arrival associated with the first audio signal; and adjust the spatial sound filter based on the direction of arrival associated with the first audio signal.

Aspect 6: The wireless device according to any one of aspects 1 to 5, wherein the at least one processor is further configured to: determine, based on the first set of RF sensing data, a proximity of a second reflector from the plurality of reflectors to the first reflector; and provide, based on the configuration of the spatial sound filter, an instruction for moving at least one of the first reflector or the second reflector.

Aspect 7: The wireless device according to any one of aspects 1 to 6, further comprising an audio detection device coupled to the at least one processor, wherein to determine the at least one acoustic setting the at least one processor is further configured to: enable the audio detection device from an idle mode in response to determining that the classification of the first reflector corresponds to an object that is capable of producing sound, wherein the audio detection device is configured to receive speech input; and provide an indication that the audio detection device is ready to receive speech input based on the object that is capable of producing sound being detected.

Aspect 8: The wireless device according to any one of aspects 1 to 7, wherein the at least one processor is further configured to: in response to determining that the classification of the first reflector corresponds to a human, obtain a second set of RF sensing data associated with a second plurality of received waveforms corresponding to a second transmitted waveform reflected off of the plurality of reflectors, wherein the second transmitted waveform has a higher bandwidth than the first transmitted waveform.

Aspect 9: The wireless device according to aspect 8, wherein the at least one processor is further configured to: determine, based at least on the second set of RF sensing data, an identity associated with the human.

Aspect 10: The wireless device according to aspect 9, wherein the at least one acoustic setting is associated with the identity and includes at least one of a device acoustic parameter, a local application parameter, a remote application parameter, an environmental parameter, or any combination thereof.

Aspect 11: The wireless device according to any one of aspects 8 to 10, wherein the at least one processor is further configured to: determine, based at least on the second set of RF sensing data, a movement of the human.

Aspect 12: The wireless device according to any one of aspects 8 to 11, wherein the at least one processor is further configured to: determine that the human is within a threshold distance of an audio device; and send a signal to enable the audio device.

Aspect 13: The wireless device according to any one of aspects 1 to 12, wherein the first transmitted waveform is transmitted by a second wireless device.

Aspect 14: The wireless device according to any one of aspects 1 to 13, wherein the first set of RF sensing data comprises channel state information (CSI) data.

Aspect 15: The wireless device according to any one of aspects 1 to 14, further comprising at least one transceiver coupled to the at least one processor, wherein the at least one processor is further configured to: transmit, via the at least one transceiver, the first transmitted waveform; and receive, via the at least one transceiver, the first plurality of received waveforms.

Aspect 16: The wireless device according to any one of aspects 1 to 15, wherein the at least one processor is further configured to: determine a distance and an angle of arrival between the wireless device and the first reflector based on the first set of RF sensing data.

Aspect 17: A method including operations according to any of aspects 1 to 16.

Aspect 18: A computer-readable medium comprising at least one instruction for causing a computer or processor to perform operations according to any of aspects 1 to 16.

Aspect 19: An apparatus including means for performing operations according to any of aspects 1 to 18.

What is claimed is:

1. A wireless device, comprising:
at least one memory; and
at least one processor coupled to the at least one memory and configured to:
obtain a first set of radio frequency (RF) sensing data associated with a first plurality of received waveforms corresponding to a first transmitted waveform reflected off of a plurality of reflectors;
determine a classification of a first reflector from the plurality of reflectors based on the first set of RF sensing data;
enable an audio detection device from an idle mode in response to determining that the classification of the first reflector corresponds to an object that is capable of producing sound, wherein the audio detection device is configured to receive speech input; and
provide an indication that the audio detection device is ready to receive speech input based on the object that is capable of producing sound being detected.

2. The wireless device of claim 1, wherein the at least one processor is further configured to:
determine a position of the first reflector based on the first set of RF sensing data; and
configure a spatial sound filter directed to the position of the first reflector, wherein the spatial sound filter corresponds to the audio detection device.

3. The wireless device of claim 2, wherein the classification of the first reflector corresponds to a human and the spatial sound filter corresponds to a fixed beamformer.

4. The wireless device of claim 2, wherein the classification of the first reflector corresponds to an acoustic interfering object and the spatial sound filter corresponds to a null beamformer.

5. The wireless device of claim 2, further comprising a plurality of microphones coupled to the at least one processor, wherein the at least one processor is further configured to:

receive, via the plurality of microphones, a first audio signal from the first reflector;

determine a direction of arrival associated with the first audio signal; and adjust the spatial sound filter based on the direction of arrival associated with the first audio signal.

6. The wireless device of claim 2, wherein the at least one processor is further configured to:

determine, based on the first set of RF sensing data, a proximity of a second reflector from the plurality of reflectors to the first reflector; and provide, based on a configuration of the spatial sound filter, an instruction for moving at least one of the first reflector or the second reflector.

7. The wireless device of claim 1, further comprising the audio detection device coupled to the at least one processor.

8. The wireless device of claim 1, wherein the at least one processor is further configured to:

in response to determining that the classification of the first reflector corresponds to a human, obtain a second set of RF sensing data associated with a second plurality of received waveforms corresponding to a second transmitted waveform reflected off of the plurality of reflectors, wherein the second transmitted waveform has a higher bandwidth than the first transmitted waveform.

9. The wireless device of claim 8, wherein the at least one processor is further configured to:

determine, based at least on the second set of RF sensing data, an identity associated with the human.

10. The wireless device of claim 9, wherein at least one acoustic setting is associated with the identity and includes at least one of a device acoustic parameter, a local application parameter, a remote application parameter, an environmental parameter, or any combination thereof.

11. The wireless device of claim 8, wherein the at least one processor is further configured to:

determine, based at least on the second set of RF sensing data, a movement of the human.

12. The wireless device of claim 11, wherein the at least one processor is further configured to:

determine that the human is within a threshold distance of an audio device; and send a signal to enable the audio device.

13. The wireless device of claim 1, wherein the first transmitted waveform is transmitted by a second wireless device.

14. The wireless device of claim 1, wherein the first set of RF sensing data comprises channel state information (CSI) data.

15. The wireless device of claim 1, further comprising at least one transceiver coupled to the at least one processor, wherein the at least one processor is further configured to:

transmit, via the at least one transceiver, the first transmitted waveform; and receive, via the at least one transceiver, the first plurality of received waveforms.

16. The wireless device of claim 1, wherein the at least one processor is further configured to:

determine a distance and an angle of arrival between the wireless device and the first reflector based on the first set of RF sensing data.

17. A method comprising:

obtaining a first set of radio frequency (RF) sensing data associated with a first plurality of received waveforms corresponding to a first transmitted waveform reflected off of a plurality of reflectors;

determining a classification of a first reflector from the plurality of reflectors based on the first set of RF sensing data;

enabling an audio detection device from an idle mode in response to determining that the classification of the first reflector corresponds to an object that is capable of producing sound, wherein the audio detection device is configured to receive speech input; and providing an indication that the audio detection device is ready to receive speech input based on the object that is capable of producing sound being detected.

18. The method of claim 17, further comprising:

determining a position of the first reflector based on the first set of RF sensing data; and configuring a spatial sound filter directed to the position of the first reflector, wherein the spatial sound filter corresponds to the audio detection device.

19. The method of claim 18, wherein the classification of the first reflector corresponds to a human and the spatial sound filter corresponds to a fixed beamformer.

20. The method of claim 18, wherein the classification of the first reflector corresponds to an acoustic interfering object and the spatial sound filter corresponds to a null beamformer.

21. The method of claim 18, further comprising:

receiving, via a plurality of microphones, a first audio signal from the first reflector;

determining a direction of arrival associated with the first audio signal; and adjusting the spatial sound filter based on the direction of arrival associated with the first audio signal.

22. The method of claim 18, further comprising:

determining, based on the first set of RF sensing data, a proximity of a second reflector from the plurality of reflectors to the first reflector; and providing, based on a configuration of the spatial sound filter, an instruction for moving at least one of the first reflector or the second reflector.

23. The method of claim 17, further comprising:

in response to determining that the classification of the first reflector corresponds to a human, obtaining a second set of RF sensing data associated with a second plurality of received waveforms corresponding to a second transmitted waveform reflected off of the plurality of reflectors, wherein the second transmitted waveform has a higher bandwidth than the first transmitted waveform.

24. The method of claim 23, further comprising:

determining, based at least on the second set of RF sensing data, an identity associated with the human.

25. The method of claim 24, wherein at least one acoustic setting is associated with the identity and includes at least one of a device acoustic parameter, a local application parameter, a remote application parameter, an environmental parameter, or any combination thereof.

26. The method of claim 23, further comprising:

determining, based at least on the second set of RF sensing data, a movement of the human.

27. The method of claim 26, further comprising:

determining that the human is within a threshold distance of an audio device; and sending a signal to enable the audio device.

28. The method of claim 17, wherein the first transmitted waveform is transmitted by a second wireless device.

29. The method of claim 17, wherein the first set of RF sensing data comprises channel state information (CSI) data.

30. The method of claim 17, further comprising:

transmitting, via at least one transceiver, the first transmitted waveform; and receiving, via the at least one transceiver, the first plurality of received waveforms.

31. The method of claim 17, further comprising:

determining a distance and an angle of arrival between a wireless device and the first reflector based on the first set of RF sensing data.

* * * * *